United States Patent
Ito

(10) Patent No.: US 7,419,450 B2
(45) Date of Patent: Sep. 2, 2008

(54) LIGHT SOURCE APPARATUS FOR ELECTRONIC ENDOSCOPE AND ELECTRONIC ENDOSCOPE HAVING THE LIGHT SOURCE APPARATUS

(75) Inventor: Shunichi Ito, Tokyo (JP)

(73) Assignee: Hoya Corporation, Tokyo (JP)

( * ) Notice: Subject to any disclaimer, the term of this patent is extended or adjusted under 35 U.S.C. 154(b) by 520 days.

(21) Appl. No.: 11/256,075

(22) Filed: Oct. 24, 2005

(65) Prior Publication Data

US 2006/0088303 A1    Apr. 27, 2006

(30) Foreign Application Priority Data

Oct. 25, 2004   (JP)  ............... 2004-309539
Oct. 25, 2004   (JP)  ............... 2004-309540

(51) Int. Cl.
    *F16H 3/72*    (2006.01)
(52) U.S. Cl. ............ 475/5; 362/574; 600/178; 475/282; 475/311; 475/317; 180/65.2
(58) Field of Classification Search ............ None
See application file for complete search history.

(56) References Cited

U.S. PATENT DOCUMENTS

| 4,740,837 A | | 4/1988 | Yanagisawa et al. | |
| 5,001,556 A | * | 3/1991 | Nakamura et al. | 348/70 |
| 6,606,113 B2 | * | 8/2003 | Nakamura | 348/45 |
| 6,817,977 B2 | | 11/2004 | Ito | |
| 7,306,533 B2 | * | 12/2007 | Ito | 475/5 |
| 2005/0220447 A1 | | 10/2005 | Ito | |

FOREIGN PATENT DOCUMENTS

| JP | 62-069222 | 3/1987 |
| JP | 7-085132 | 9/1995 |

OTHER PUBLICATIONS

U.S. Appl. No. 11/219,825 to Ito, filed Sep. 7, 2005.

* cited by examiner

*Primary Examiner*—David D. Le
(74) *Attorney, Agent, or Firm*—Greenblum & Bernstein, P.L.C.

(57) ABSTRACT

A light source apparatus for an electronic endoscope includes a light source; a rotary shutter including a pair of coaxial aperture controlling rotary plates, which are selectively rotatable relative to and together with each other and each includes light interception portions and opening portions, wherein a combined opening angle of the opening portions is varied by a relative rotation of the aperture controlling rotary plates, and the amount of emitted light is controlled by varying the combined opening angle, and the controlled amount of the light is emitted through the rotary shutter by integral rotation of the aperture controlling rotary plates; and a mechanical stop device, positioned between the aperture controlling rotary plates, for limiting the range of relative rotation angle between the aperture controlling rotary plates from a maximum opening angle to a minimum opening angle.

19 Claims, 14 Drawing Sheets

LIGHT SOURCE APPARATUS FOR ELECTRONIC ENDOSCOPE AND ELECTRONIC ENDOSCOPE HAVING THE LIGHT SOURCE APPARATUS

BACKGROUND OF THE INVENTION

1. Field of the Invention

The present invention relates to an electronic endoscope, and more specifically relates to a light source apparatus for an electronic endoscope using a plurality of aperture controlling rotary plates.

2. Description of the Prior Art

In conventional electronic endoscopes, in order to provide appropriate light modulation, an endoscope recording apparatus has been proposed in, for example, Japanese Unexamined Patent Publication No. 62-69222. The apparatus disclosed in this publication is provided with a rotary shutter having a rotatable shaft, wherein the distance between the axis of the rotatable shaft and the optical axis of illuminating light emitted from a light source for the endoscope is variable. The rotary shutter is shaped so that a difference in peripheral speed occurs between the radial portions thereof, i.e., the rotary shutter is shaped so that the aperture size varies during rotation of the rotary shutter. Light modulation is carried out by altering the distance between the axis of the rotatable shaft and the optical axis of illuminating light and by utilizing the peripheral speed difference of the rotary shutter.

In Japanese Unexamined Patent Publication No. 62-69222, light modulation can be performed, however, the structure of the rotary shutter is complex. Furthermore, it is necessary to provide a mechanism to vary the distance between the rotary shutter and the optical axis of the light source for the endoscope. Accordingly, the manufacturing cost is high and the manufacturing process is troublesome. Moreover, in order to achieve such a construction, the outer diameter of the rotary shutter must be several times larger than that of the light bundle, thus resulting in an increase in size of the rotary shutter. If the rotary shutter is asymmetrical in shape with respect to the rotation axis thereof in order to vary the aperture, the center of rotation does not align with the center of gravity, so that the rotary shutter tends to lose balance during rotation. Consequently, correct emission of the illuminating light cannot occur, and the rotary shutter and the surrounding members may break.

SUMMARY OF THE INVENTION

The present invention provides a light source apparatus for an electronic endoscope in which the range of relative rotation angle between the pair of aperture controlling rotary plates can be easily limited to a predetermined rotation angle range and rotations of the pair of aperture controlling rotary plates can be easily controlled. The present invention further provides an endoscope having such a light source apparatus.

Moreover, the present invention provides a light source apparatus for an electronic endoscope, wherein the pair of aperture controlling rotary plates can easily be assembled in a manner to be arranged coaxial with each other, and further provides an electronic endoscope having such a light source apparatus.

According to an aspect of the present invention, a light source apparatus for an electronic endoscope is provided, including a light source; a rotary shutter for intercepting or emitting light emitted from the light source toward a light guide, the rotary shutter including a pair of aperture controlling rotary plates having axes coaxial with each other and extending parallel with an optical axis of the light source, which are selectively rotatable one of relative to and together with each other and each includes light interception portions and opening portions alternately arranged in a rotation direction, wherein a combined opening angle of the opening portions of the rotary shutter is varied by a relative rotation of the pair of aperture controlling rotary plates, and wherein the amount of the light emitted from the light source is controlled by varying the combined opening angle, and the controlled amount of the light is emitted through the rotary shutter by integral rotation of the pair of aperture controlling rotary plates; and a mechanical stop device, positioned between the pair of aperture controlling rotary plates, for limiting the range of relative rotation angle between the pair of aperture controlling rotary plates to a predetermined range from a maximum opening angle to a minimum opening angle.

It is desirable for the mechanical stop device to include a minimum opening angle defining recess and a maximum opening angle defining recess which are formed on one of the pair of aperture controlling rotary plates; and a stop pin which projects from the other of the pair of aperture controlling rotary plates to be selectively engageable with the minimum opening angle defining recess and the maximum opening angle defining recess. The minimum opening angle is defined by engagement of the stop pin with the minimum opening angle defining recess. The maximum opening angle is defined by engagement of the stop pin with the maximum opening angle defining recess.

The light source apparatus can further include a first planetary gear mechanism including a first internal tooth gear coaxial with the rotation axis of the rotary shutter, a first sun gear coaxial with an axis of the first internal tooth gear, and at least one first planet gear which is simultaneously engaged with the first internal tooth gear and the first sun gear; a second planetary gear mechanism including a second internal tooth gear identical to the first internal tooth gear and coaxial with the rotation axis of the rotary shutter, a second sun gear identical to the first sun gear and coaxial with an axis of the second internal tooth gear, and at least one second planet gear, identical to the first planet gear, which is simultaneously engaged with the second internal tooth gear and the second sun gear; and a carrier device which is rotatable about an axis coincident with the rotation axis of the rotary shutter, wherein the carrier device holds the first and second planet gears in a same phase position with respect to the first and second internal tooth gears, and supports the first and second planet gears to allow the first and second planet gears to rotate relative to each other. One of the first sun gear and the first internal tooth gear of the first planetary gear mechanism is non-rotatably fixed, and the other of the first sun gear and the first internal tooth gear is rotated together with one of the aperture controlling rotary plates by a motor, and one of the second sun gear and the second internal tooth gear of the second planetary gear mechanism is driven together with the other of the aperture controlling rotary plates by a phase difference motor.

The light source apparatus can include a first planetary gear mechanism including a first internal tooth gear coaxial with the rotation axis of the rotary shutter, a first sun gear coaxial with an axis of the first internal tooth gear, and at least one first planet gear which is simultaneously engaged with the first internal tooth gear and the first sun gear; a second planetary gear mechanism including a second internal tooth gear identical to the first internal tooth gear and coaxial with the rotation axis of the rotary shutter, a second sun gear identical to the first sun gear and coaxial with an axis of the second internal tooth gear, and at least one second planet gear, identical to the first planet gear, which is simultaneously engaged with the second internal tooth gear and the second sun gear; and a carrier device which is rotatable about an axis coincident with the rotation axis of the rotary shutter, wherein the carrier device holds the first and second planet gears in a same phase position with respect to the first and second internal tooth gears, and supports the first and second planet gears to allow the first and second planet gears to rotate relative to each other. The second internal tooth gear is non-rotatably fixed, and the second sun gear and one of the aperture controlling rotary plates are rotated together. The first sun gear and the other of the aperture controlling rotary plates are driven by a motor, and the first internal tooth gear is driven by a phase difference motor.

In an embodiment, an electronic endoscope having the light source apparatus is provided, further including an operating portion; and an insertion portion extending from the operating portion and inserted into an object to be viewed. The light guide is inserted in the operating portion and the insertion portion so that a distal end of the light guide extends to a distal end of the insertion portion, and the light source emits illuminating light to the light guide.

In an embodiment, a light source apparatus for an electronic endoscope is provided, including a light source; a rotary shutter for intercepting or emitting light emitted from the light source toward a light guide, the rotary shutter including a pair of aperture controlling rotary plates having axes coaxial with each other and extending parallel with an optical axis of said light source, which are selectively rotatable one of relative to and together with each other and each includes light interception portions and opening portions alternately arranged in a rotation direction, wherein a combined opening angle of the opening portions of the rotary shutter is varied by a relative rotation of the pair of aperture controlling rotary plates, and wherein the amount of the light emitted from the light source is controlled by varying the combined opening angle, and the controlled amount of the light is emitted through the rotary shutter by integral rotation of the pair of aperture controlling rotary plates; a central rotating shaft driven to rotate; a first rotary plate support disc to which one of the pair of aperture controlling rotary plates is fixed, the first rotary plate support disc including a coaxial cylinder portion coaxial with the central rotating shaft; a second rotary plate support disc to which the other of the pair of aperture controlling rotary plates is fixed, the second rotary plate support disc being freely rotatable with respect to the central rotating shaft; and a no-phase fixing cylinder fitted into an annular space formed between the central rotating shaft and the coaxial cylinder portion of the first rotary plate support disc to make the central rotating shaft and the coaxial cylinder portion integral with each other in the rotation direction. The no-phase fixing cylinder includes an insertion portion having a substantially wedge shape in cross section taken along a plane on which an axis of the no-phase fixing cylinder lies. Each of the central rotating shaft and the coaxial cylinder portion of the first rotary plate support disc has a cross sectional shape allowing surface contact with the insertion portion of the no-phase fixing cylinder when the no-phase fixing cylinder is fitted into the annular space.

It is desirable for a surface of the central rotating shaft which comes in surface contact with the no-phase fixing cylinder to include an annular tapered surface which is tapered by an angle identical to a taper angle of an associated contacting surface of the no-phase fixing cylinder, wherein a surface of the coaxial cylinder portion which comes in surface contact with the no-phase fixing cylinder includes an annular tapered surface which is tapered by an angle identical to a taper angle of an associated contacting surface of the no-phase fixing cylinder.

It is desirable for the light source apparatus to include a cylindrical cover member for pushing the no-phase fixing cylinder into the annular space.

It is desirable for the pushing force to be adjusted by adjusting the amount of screw-engagement of a set screw for fixing the cylindrical cover member to an end of the central rotating shaft.

The light source apparatus can include a mechanical stop device, positioned between the pair of aperture controlling rotary plates, for limiting the range of relative rotation angle between the pair of aperture controlling rotary plates to a predetermined range from a maximum opening angle to a minimum opening angle.

It is desirable for the mechanical stop device to include a minimum opening angle defining recess and a maximum opening angle defining recess which are formed on one of the pair of aperture controlling rotary plates at respective positions a same radial distance away from the rotation axis; and a stop pin which projects from the other of the pair of aperture controlling rotary plates to be selectively engageable with the minimum opening angle defining recess and the maximum opening angle defining recess, the stop pin being positioned at a point a predetermined distance away from the rotation axis, the predetermined distance being identical to a distance between the rotation axis and either of the minimum opening angle defining recess and the maximum opening angle defining recess. The minimum opening angle is defined by engagement of the stop pin with the minimum opening angle defining recess, and the maximum opening angle is defined by engagement of the stop pin with the maximum opening angle defining recess.

It is desirable for the light source apparatus to include a first planetary gear mechanism including a first internal tooth gear coaxial with the rotation axis of the rotary shutter, a first sun gear coaxial with an axis of the first internal tooth gear, and at least one first planet gear which is simultaneously engaged with the first internal tooth gear and the first sun gear; a second planetary gear mechanism including a second internal tooth gear identical to the first internal tooth gear and coaxial with the rotation axis of the rotary shutter, a second sun gear identical to the first sun gear and coaxial with an axis of the second internal tooth gear, and at least one second planet gear, identical to the first planet gear, which is simultaneously engaged with the second internal tooth gear and the second sun gear; and a carrier device which is rotatable about an axis coincident with the rotation axis of the rotary shutter, wherein the carrier device holds the first and second planet gears in a same phase position with respect to the first and second internal tooth gears, and supports the first and second planet gears to allow the first and second planet gears to rotate relative to each other. One of the first sun gear and the first internal tooth gear of the first planetary gear mechanism is non-rotatably fixed, and the other of the first sun gear and the first internal tooth gear is rotated together with one of the aperture controlling rotary plates by a motor, and one of the second sun gear and the second internal tooth gear of the second planetary gear mechanism is driven together with the other of the aperture controlling rotary plates by a phase difference motor.

It is desirable for the first internal tooth gear to be fixed so as not to rotate; wherein the motor drives the first sun gear and the one of the aperture controlling rotary plates, and the phase difference motor drives the second internal tooth gear.

It is desirable for the second internal tooth gear is rotatably supported by a gear bearing.

It is desirable for the light source apparatus to include a first planetary gear mechanism including a first internal tooth gear coaxial with the rotation axis of the rotary shutter, a first sun gear coaxial with an axis of the first internal tooth gear, and at least one first planet gear which is simultaneously engaged with the first internal tooth gear and the first sun gear; a second planetary gear mechanism including a second internal tooth gear identical to the first internal tooth gear and coaxial with the rotation axis of the rotary shutter, a second sun gear identical to the first sun gear and coaxial with an axis of the second internal tooth gear, and at least one second planet gear, identical to the first planet gear, which is simultaneously engaged with the second internal tooth gear and the second sun gear; and a carrier device which is rotatable about an axis coincident with the rotation axis of the rotary shutter, wherein the carrier device holds the first and second planet gears in a same phase position with respect to the first and second internal tooth gears, and supports the first and second planet gears to allow the first and second planet gears to rotate relative to each other. The second internal tooth gear is fixed so as not to rotate. The second sun gear and one of the aperture controlling rotary plates are rotated together. The first sun gear and the other of the aperture controlling rotary plates are driven by a motor. The first internal tooth gear is driven by a phase difference motor.

It is desirable for the first internal tooth gear to be rotatably supported by a gear bearing.

It is desirable for the first sun gear to be fixed so as not to rotate, wherein the first internal tooth gear is secured to the one of the aperture controlling rotary plates and is driven by the motor, the second internal tooth gear is secured to the other of the aperture controlling rotary plates, and the second sun gear is driven by the phase difference motor.

It is desirable for one of the first and second internal tooth gears to be rotatably supported by a gear bearing.

In an embodiment, an electronic endoscope having the light source apparatus is provided, including an operating portion; and an insertion portion extending from the operating portion and inserted into an object to be viewed. The light guide is inserted in the operating portion and the insertion portion so that a distal end of the light guide extends to a distal end of the insertion portion, and the light source emits illuminating light to the light guide.

The present disclosure relates to subject matter contained in Japanese Patent Applications Nos. 2004-309539 and 2004-309540 (filed on Oct. 25, 2004) which are expressly incorporated herein in their entireties.

BRIEF DESCRIPTION OF THE DRAWINGS

The present invention will be discussed below in detail with reference to the accompanying drawings, in which.

DESCRIPTION OF THE PREFERRED EMBODIMENTS

A first embodiment of a light source apparatus according to the present invention will be discussed below with reference to FIGS. 1 through 10.

Figure 1:
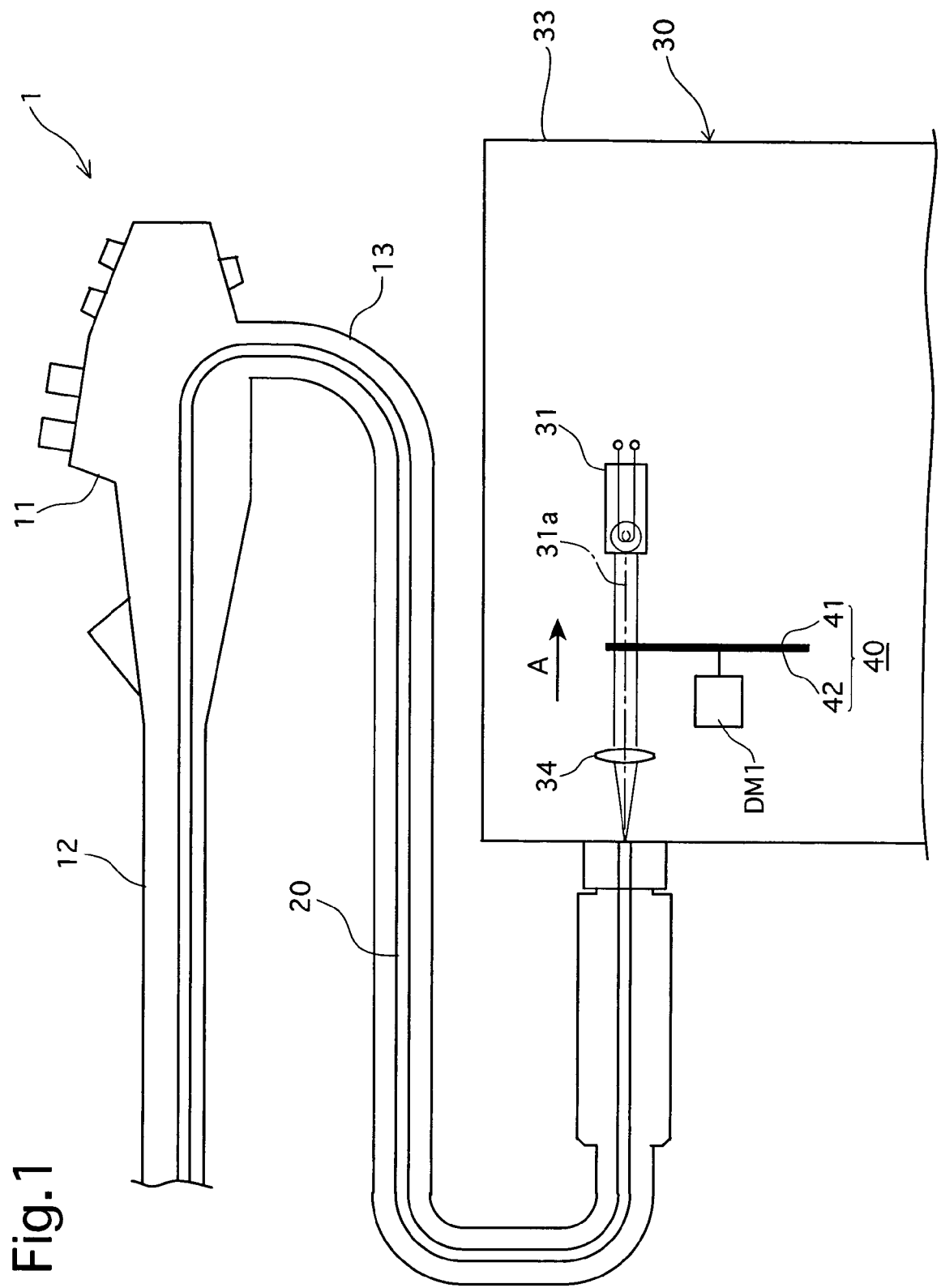
FIG. 1 is a schematic view of an electronic endoscope system including an electronic endoscope and a first embodiment of a light source apparatus according to the present invention, showing an internal structure of the light source apparatus.

As shown in FIG. 1, an electronic endoscope 1 includes an operating portion 11 which is held by an operator, a flexible and elongated insertion portion 12 extending from the operating portion 11, and a connecting tube 13 extending from the operating portion 11. A light guide (light guide fiber bundle) 20 is arranged in the operating portion 11, the insertion portion 12, and the connecting tube 13 to emit illuminating light out of an emitting end surface formed at the distal end of the endoscope 1.

The electronic endoscope 1 is connected to a light source apparatus 30 through the connecting tube 13. The light source apparatus 30 is provided in a casing 33 thereof with a lamp (light source) 31. Light (illuminating light) emitted from the lamp 31 is incident upon the light guide 20 at the incident end surface thereof. The light transmitted through the light guide 20 is emitted to the outside of the electronic endoscope 1 from the distal end of the insertion portion 12. Light reflected by a viewed object is incident upon the insertion portion 12 through an objective optical system 15 provided at the distal end of the insertion portion 12, and is accumulated as electric charges in a CCD (solid image pickup device) 16 (see FIG. 2). All the image pixel data of the CCD 16 is processed in an image processing circuit (image processor) 18, and an image corresponding to the image pixel data is displayed on a display 19 (see FIG. 2).

The light source apparatus 30 includes, in addition to the lamp 31, a rotary shutter 40 which functions as a light controller for controlling or intercepting illuminating light emitted from the lamp 31 (having an optical axis 31a), a condenser lens 34 which condenses the light emitted from the lamp 31 and guides the light to an incident end surface of the light guide 20, and a drive mechanism DM1 for driving the rotary shutter 40.

As shown in FIGS. 3A through 7, the rotary shutter 40 is provided with a first aperture controlling rotary plate 41 and a second aperture controlling rotary plate 42 which have substantially the same outer shape.

Figure 3B:
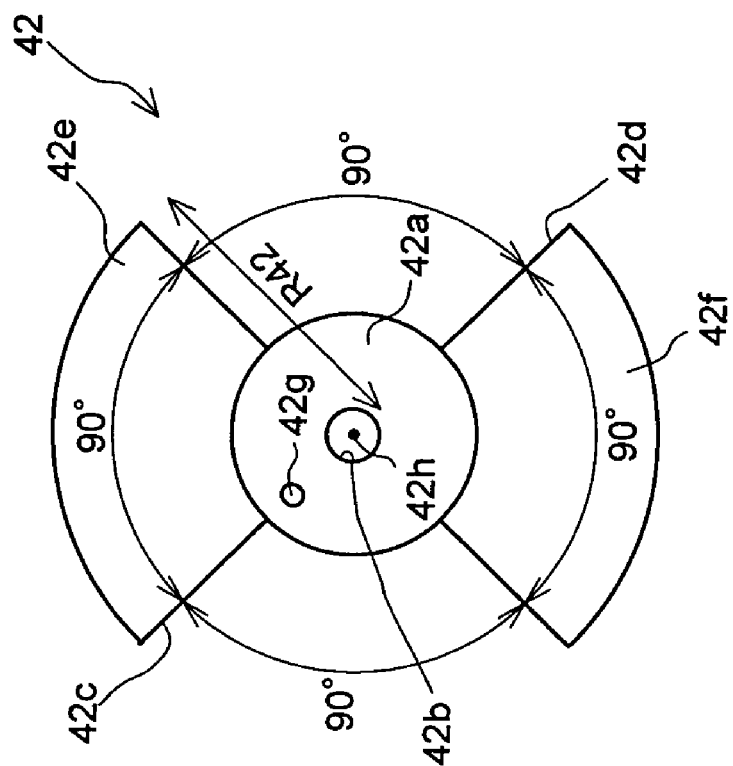
FIG. 3B is a front elevational view of a second aperture controlling rotary plate.
Figure 3A:
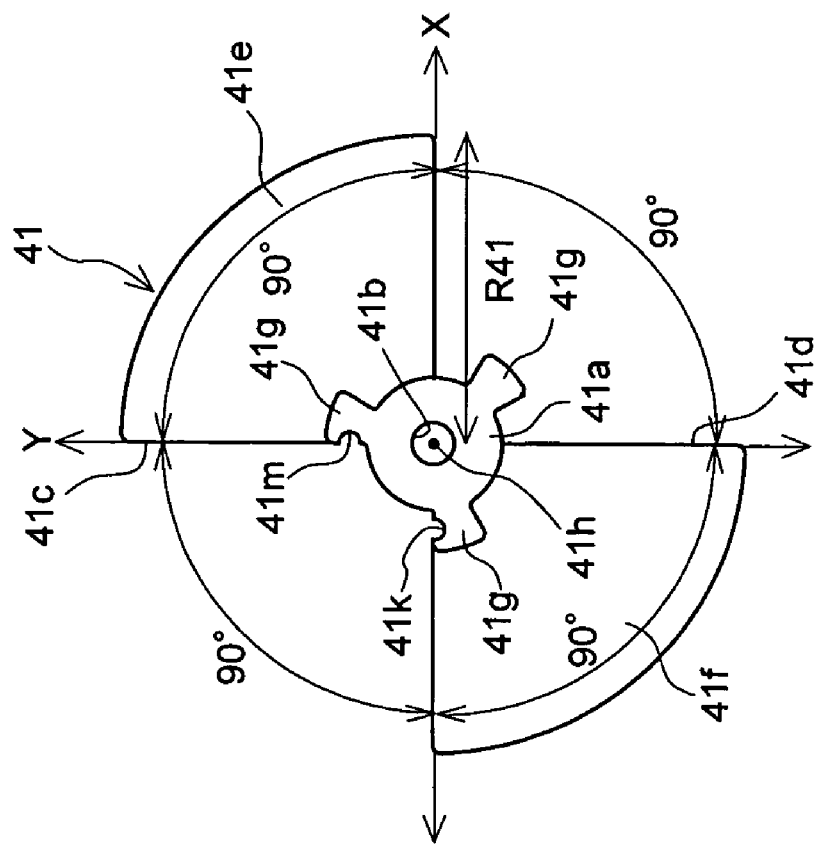
FIG. 3A is a front elevational view of a first aperture controlling rotary plate.
Figure 4:
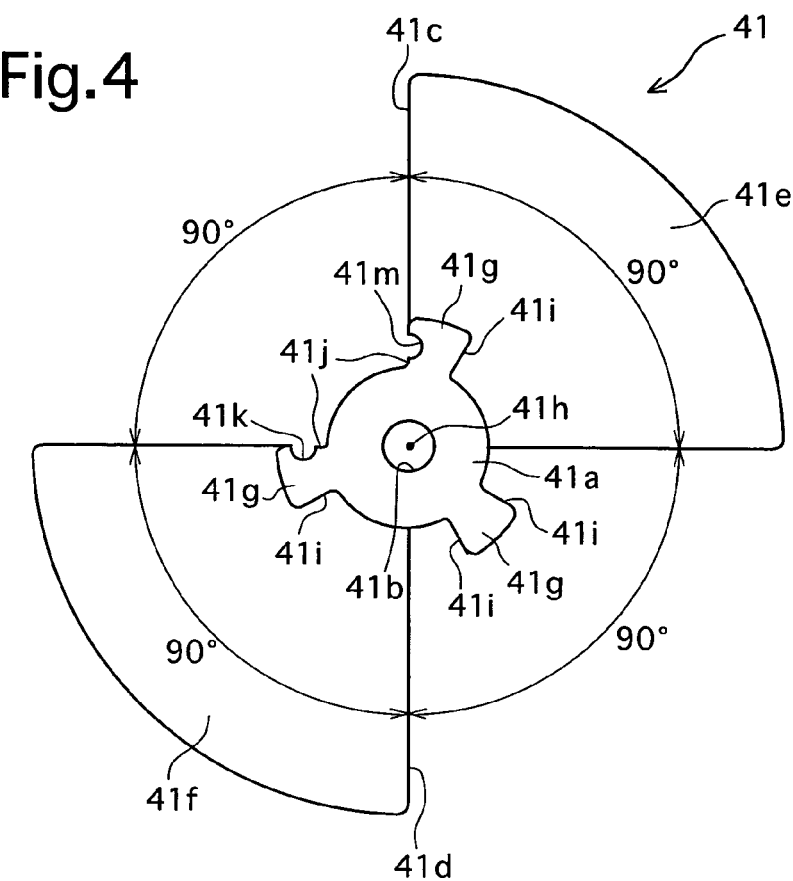
FIG. 4 is an enlarged front elevational view of the first aperture controlling rotary plate shown in FIG. 3A.

The first aperture controlling plate 41 that is shown in FIGS. 3A and 4 is an aluminum flat plate provided perpendicular to the optical axis 31a, and includes a circular center portion 41a and a pair of light intercepting portions 41e and 41f which are directly joined to the central portion 41a. The central portion 41a is provided with a circular center hole 41b having its center on a rotation axis (center of rotation) 41h of the first aperture controlling plate 41, and is further provided with three radial projections 41g which project radially outwards from the outer edge of the central portion 41a at equi-angular intervals of 120 degrees. Each radial projection 41g is provided with a pair of side edges 41i and 41j (see FIG. 4) which are positioned on the opposite sides of each radial projection 41g in a circumferential direction about the rotation axis 41h of the first aperture controlling plate 41. The two adjacent side edges 41i and two adjacent side edges 41j of any two adjacent radial projections 41g are angled relative to each other at an angle of 90 degrees about the rotation axis 41h. Additionally, two of the three radial projections 41g are provided on the side edges 41j thereof adjacent to each other with a minimum opening angle defining recess (mechanical stop) 41k and a maximum opening angle defining recess (mechanical stop) 41m, respectively. The minimum opening angle defining recess 41k and the maximum opening angle defining recess 41m have the same shape and size, and are positioned the same radial distance away from the rotation axis 41h.

The pair of light intercepting portions 41e and 41f are arranged symmetrically with respect to the rotation axis 41h of the central portion 41a, and are each substantially in the form of a sector having a central angle of 90 degrees which is centered on the rotation axis 41h. Opening portions 41c and 41d each having an angle of 90 degrees with respect to the rotation axis 41h are formed between the light intercepting portions 41e and 41f. As shown in FIG. 3A, the linear distance (radius of the first aperture controlling rotary plate 41) between the rotation axis 41h and the outer edge of either of the light intercepting portions 41e and 41f is R41.

The second aperture controlling plate 42 shown in FIG. 3B is aluminum flat plate provided perpendicular to the optical axis 31a, and includes a disc portion 42a at the center of the second aperture controlling plate 42 and a pair of light intercepting portions 42e and 42f. The second aperture controlling plate 42 is provided at a central portion of the disc portion 42a with a circular center hole 42b having a diameter greater than the diameter of the circular center hole 41b of the first aperture controlling plate 41. The second aperture controlling plate 42 is provided on the disc portion 42a with a cylindrical-column-shaped stop pin (mechanical stop) 42g, the axis of which is parallel to the optical axis 31a. The stop pin 42g projects from the disc portion 42a at a point thereon a predetermined distance away from a rotation axis (center of rotation) 42h of the central disc portion 42a, wherein the predetermined distance is identical to the distance between the rotation axis 41h and either of the minimum opening angle defining recess 41k and the maximum opening angle defining recess 41m. The radius of a cross section of the stop pin 42g is smaller than the radius (depth in a circumferential direction about the rotation axis 41h) of each of the minimum opening angle defining recess 41k and the maximum opening angle defining recess 41m to allow substantially half of the stop pin 42g to be selectively engaged in the minimum opening angle defining recess 41k and the maximum opening angle defining recess 41m. The light intercepting portions 42e and 42f are arranged symmetrically with respect to the rotation axis 42h of the central disc portion 42a, and are each substantially in the form of a sector having a central angle of 90 degrees which is centered on the rotation axis 42h. Opening portions 42c and 42d, each having an angle of 90 degrees with respect to the rotation axis 42h, are formed between the light intercepting portions 42e and 42f. As shown in FIG. 3B, the linear distance (radius of the second aperture controlling rotary plate 42) between the rotation axis 42h and the outer periphery of either of the light intercepting portions 42e and 42f is R42 (<R41).

The radii R41 and R42 are determined to be equal to or greater than the diameter of the light bundle emitted from the lamp 31 and made incident upon the rotary shutter 40. Provided that this requirement is met, R41 can be equal to or smaller than R42 (R41=R42 or R41<R42). Although the opening portions and the light intercepting portions have a center angle of 90 degrees with respect to the respective center axes 41h and 42h in the first and second aperture controlling rotary plates 41 and 42 in the illustrated embodiment, the center angle may be other than 90 degrees and the first and second aperture controlling rotary plates 41 and 42 may be different in shape.

Figure 5:
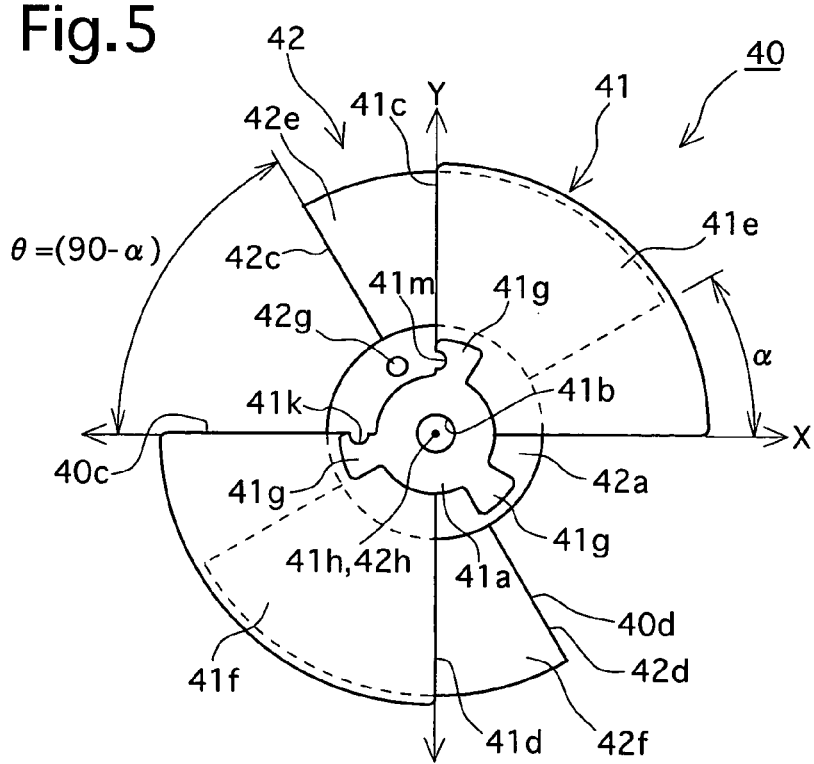
FIG. 5 is a front elevational view of a rotary shutter consisting of the first aperture controlling rotary plate shown in FIGS. 3A and 4 and the second aperture controlling rotary plate shown in FIG. 3B.
Figure 6:
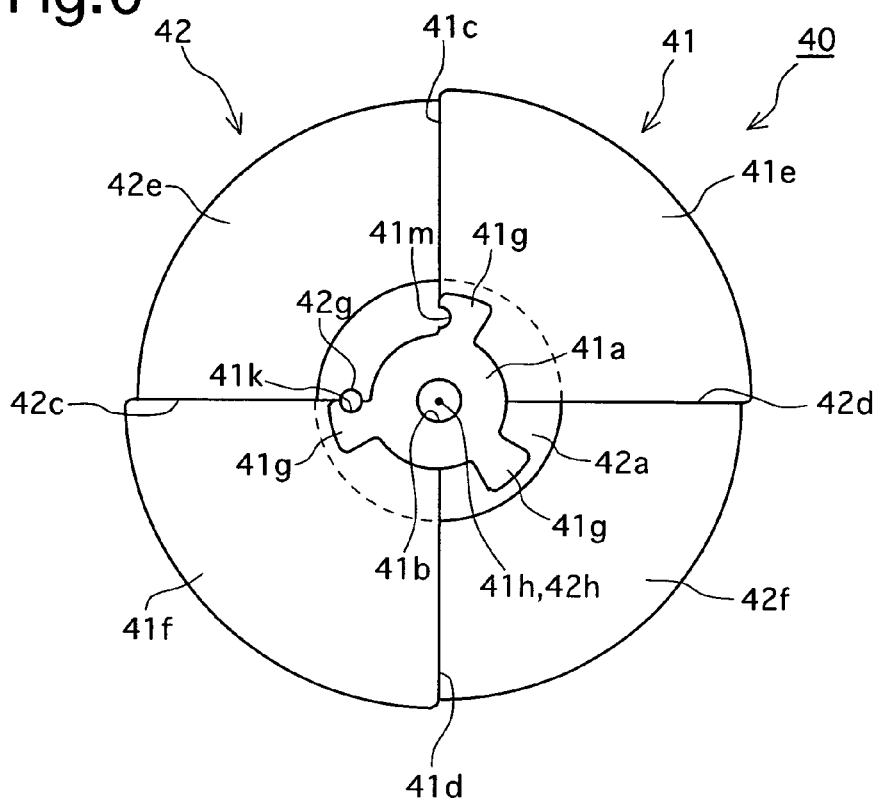
FIG. 6 is a front elevational view of the rotary shutter shown in FIG. 5 in a state where each opening angle is zero degrees.
Figure 7:
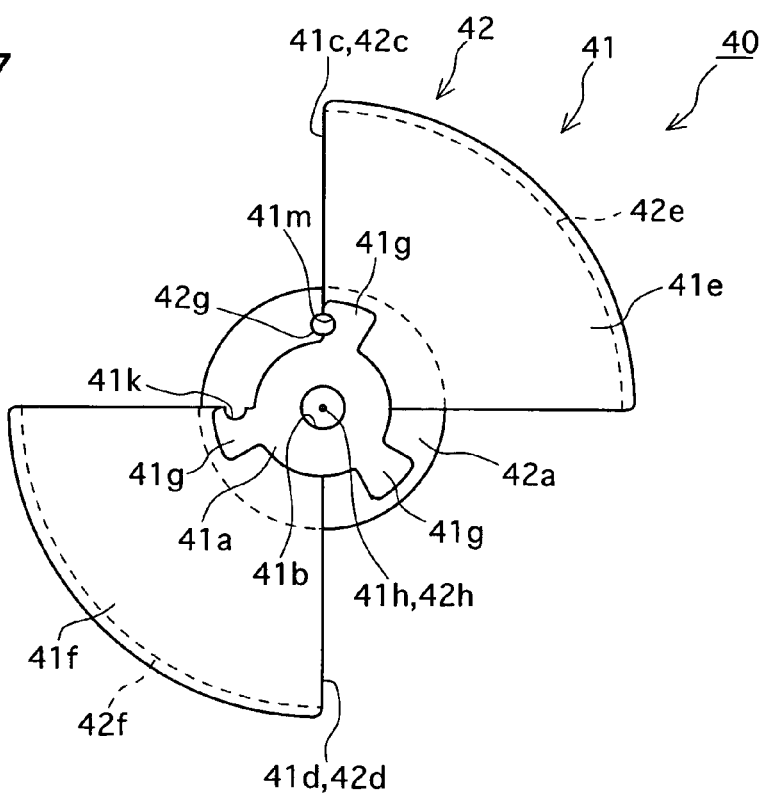
FIG. 7 is a front elevational view of the rotary shutter shown in FIG. 5 in a state where each opening angle is 90 degrees.
Figure 8:
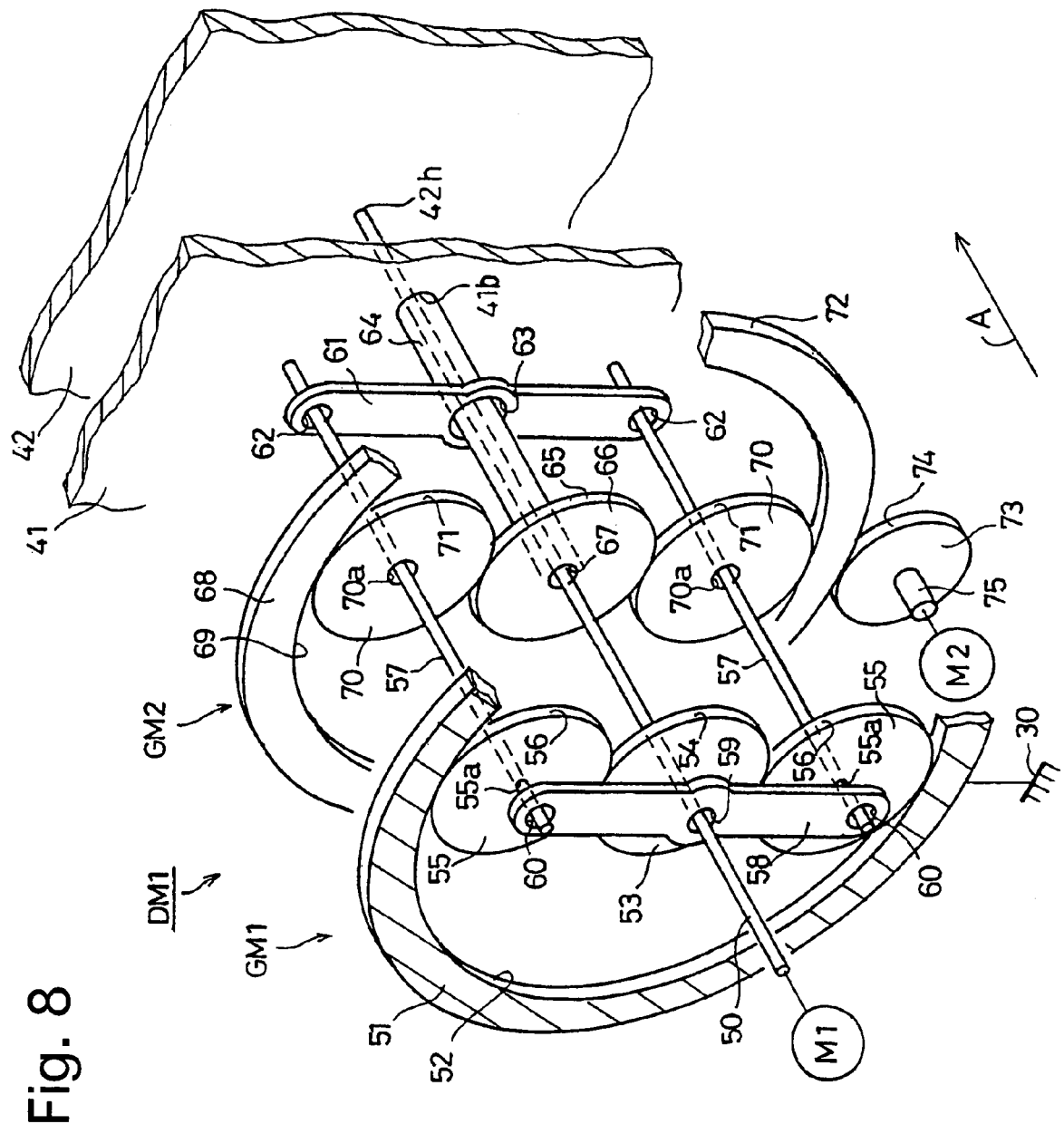
FIG. 8 is an exploded perspective schematic diagram of a drive mechanism for driving the rotary shutter shown in FIG. 5 and elements associated therewith.

As shown in FIG. 5, if the center axes 41h and 42h of the first and second aperture controlling rotary plates 41 and 42 are arranged to be coincident with each other (aligned each other), if the first aperture controlling rotary plate 41 is arranged so that the light intercepting portions 41e and 41f are located within the first quadrant and the third quadrant in X-Y coordinates (abscissa X and ordinate Y), respectively, and further if the second aperture controlling rotary plate 42 is arranged so that the light intercepting portions 42e and 42f are deviated by an angle a in the counterclockwise direction (as viewed in a direction from the condenser lens 34 side toward the lamp 31; see arrow "A" in FIGS. 1 and 8; likewise with the second embodiment and a modification thereof (see arrow "A" in FIG. 11); and likewise with the third embodiment (see arrow "A" in FIG. 14)) with respect to the light intercepting portions 41e and 41f, respectively, the opening portions 41c and 41d are partly covered by the light intercepting portions 42e and 42f, respectively. The opening portions 40c and 40d of the rotary shutter 40 thus obtained are substantially in the form of sectors which are arranged symmetrically with respect to the center axes 41h and 42h and which have a center angle (opening angle) θ equal to 90− a degrees. The opening angle θ can be varied between a range of 0 (smallest angle) to 90 degrees (largest angle) by relatively rotating the first and second aperture controlling rotary plates 41 and 42 as shown in FIGS. 6 and 7. When the opening angle θ is zero degrees as shown in FIG. 6, the second aperture controlling rotary plate 42 is prevented from rotating in the counterclockwise direction relative to the first aperture controlling rotary plate 41 by the engagement of the stop pin 42g with the minimum opening angle defining recess 41k, so that the rotary shutter 40 fully intercepts illuminating light emitted from the lamp 31. On the other hand, when the opening angle θ is ninety degrees as shown in FIG. 7, the second aperture controlling rotary plate 42 is prevented from further rotating in the clockwise direction relative to the first aperture controlling rotary plate 41 by the engagement of the stop pin 42g with the maximum opening angle defining recess 41m.

Figure 9:
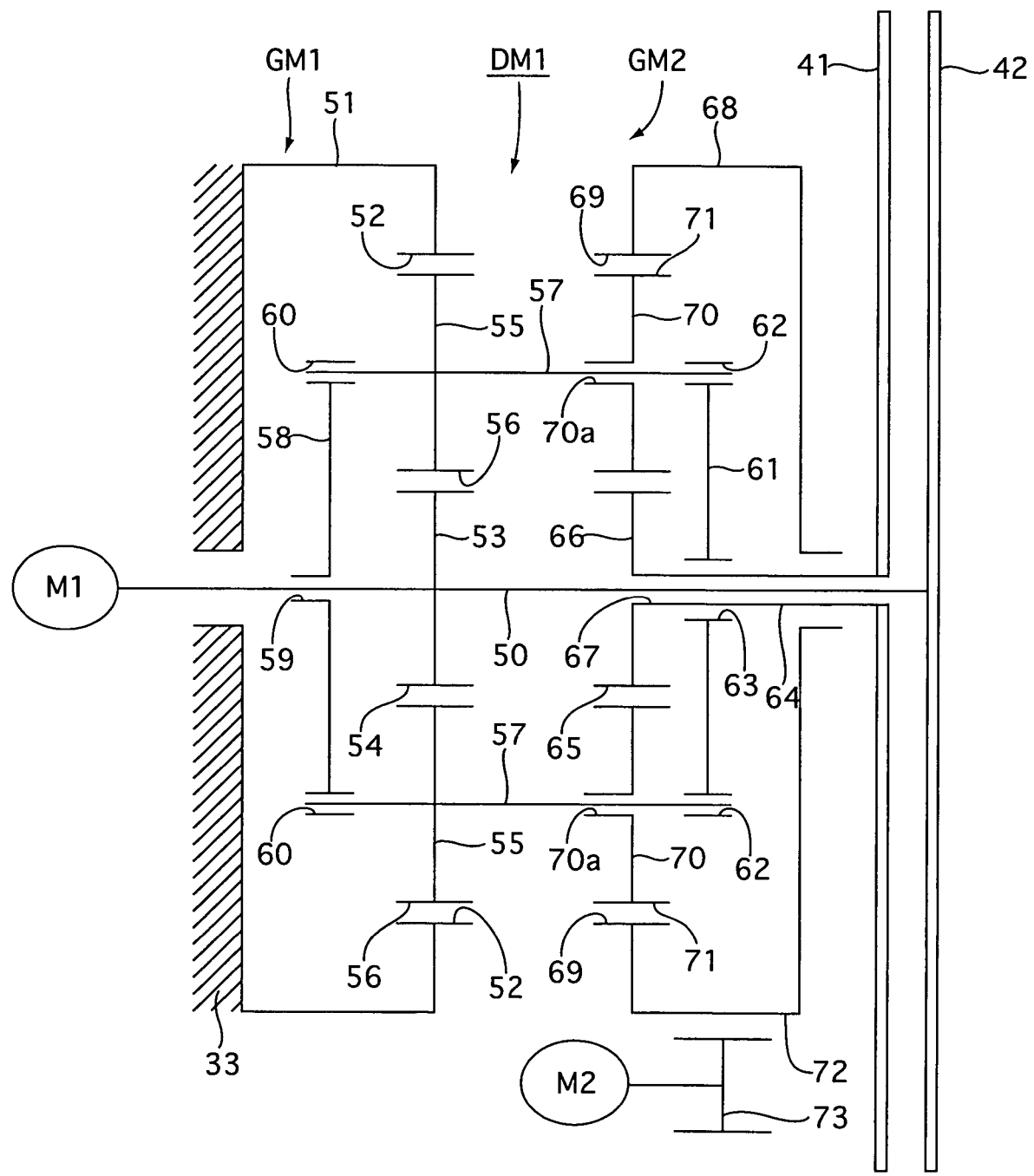
FIG. 9 is a schematic diagram of the drive mechanism shown in FIG. 8 and elements on the periphery thereof.
Figure 10:
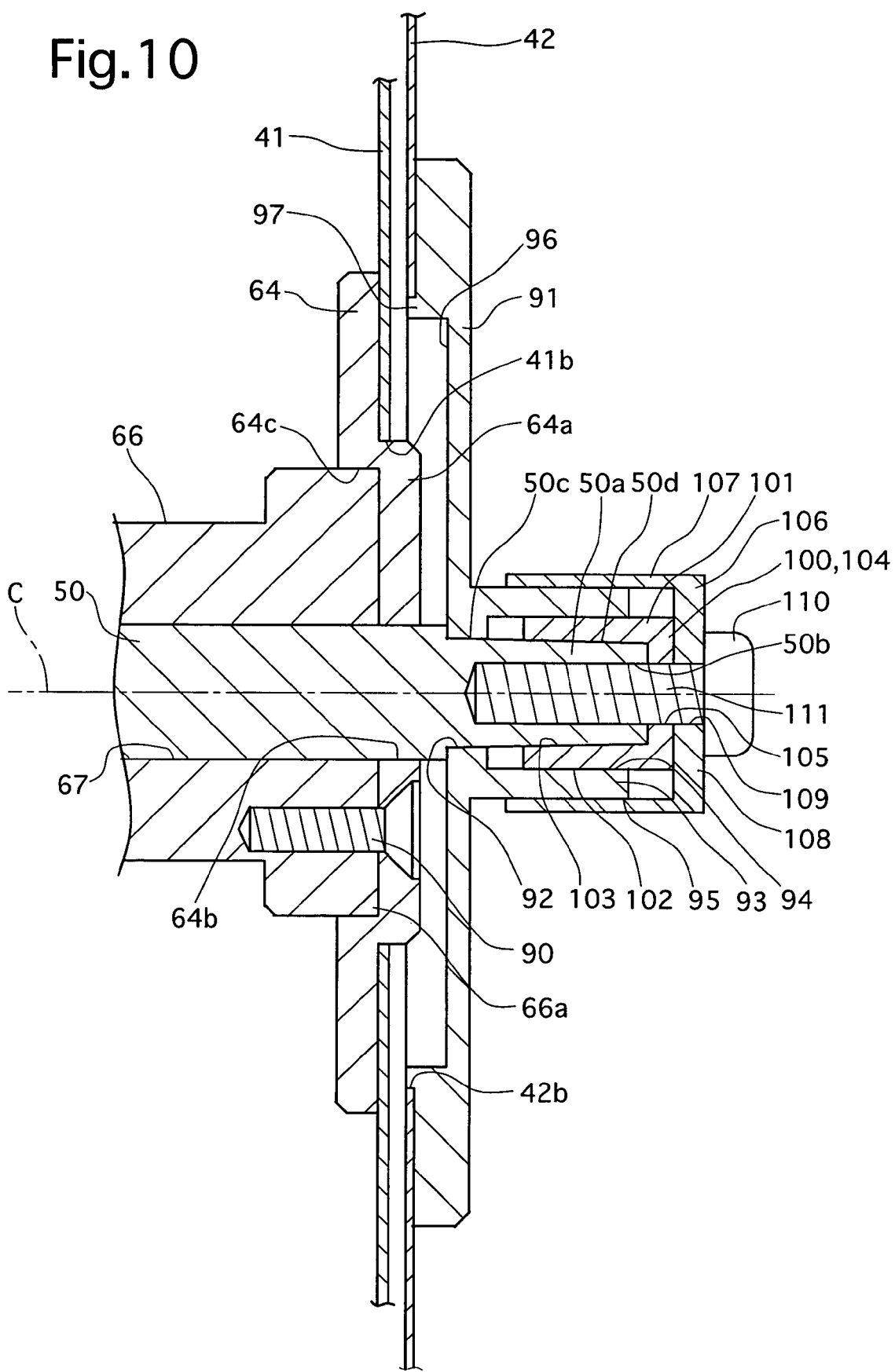
FIG. 10 is an enlarged longitudinal sectional side view of a portion of the drive mechanism shown in FIGS. 8 and 9, showing the connection relationship among the first aperture controlling rotary plate, the second aperture controlling rotary plate, a drive shaft and associated elements.

The drive mechanism DM1 for rotating the first aperture controlling rotary plate 41 and the second aperture controlling rotary plate 42 will be explained below with reference to FIGS. 8, 9 and 10, wherein FIGS. 8 and 9 schematically show the drive mechanism DM1 and FIG. 10 is an enlarged longitudinal sectional side view of a portion of the drive mechanism DM1 and elements associated therewith, showing a specific connection relationship among the first aperture controlling rotary plate 41, the second aperture controlling rotary plate 42 and the drive mechanism DM1.

The drive mechanism DM1 is provided with a drive shaft (rotating shaft/central rotating shaft) 50 which extends perpendicularly to the first and second aperture controlling rotary plates 41 and 42 (i.e., parallel with the optical axis 31a) and which relatively rotatably extends through the center hole 41b that is formed in the first aperture controlling rotary plate 41. The center axes 41h and 42h are coaxial with an axis C (see FIG. 10) of the drive shaft 50. A drive shaft of a chopper motor (motor) M1 secured to the casing 33 of the light source apparatus 30 is fixed to one end of the drive shaft 50 to be coaxial therewith (i.e., "coaxial" when viewed from the direction of the arrow "A" shown in FIG. 8) so that rotation of the chopper motor M1 causes the drive shaft 50 to rotate about the axis C. The drive mechanism DM1 is provided around the drive shaft 50 with an internal tooth gear (first internal tooth gear) 51 in the form of a ring coaxial with the drive shaft 50. The internal tooth gear 51 is secured to the casing 33 of the light source apparatus 30 (the internal tooth gear 51 is hatched in FIG. 8 to indicate that the internal tooth gear is a stationary member). The internal tooth gear 51 is provided, on its entire inner peripheral surface, with sixty internal teeth 52 at equal pitches. The detailed shape of the internal teeth 52 (and all the other gears which will be discussed later) is not shown for the purpose of simplicity. The drive mechanism DM1 is provided with a first circular sun gear 53 which is smaller in diameter than the internal tooth gear 51 and which lies in the same plane as the internal tooth gear 51. The first sun gear 53 is coaxially fitted on the drive shaft 50 and fixed thereto. The first sun gear 53 is provided on the entire outer edge thereof with twenty four external teeth 54 at equal pitches. The drive mechanism DM1 is provided between the internal tooth gear 51 and the first sun gear 53 with two first planet gears 55. The first planet gears 55 are each provided with eighteen external teeth 56 at equal pitches. The first planet gears 55 are identical in diameter to the first sun gear 53 and are arranged symmetrically with respect to the first sun gear 53. The external teeth 56 of each first planet gear 55 are in mesh with the internal teeth 52 of the internal tooth gear 51 and the external teeth 54 of the first sun gear 53. Each first planet gear 55 is provided with a circular mount hole 55a at the central portion thereof. The drive mechanism DM1 is provided on opposite sides of the drive shaft 50 with two driven shafts 57 extending parallel to the drive shaft 50, respectively, and end portions of the two driven shafts 57 which are located adjacent to the chopper motor M1 are fitted in the mount holes 55a of the first planet gears 55 to be fixed thereto, respectively. The drive mechanism DM1 is provided with a first carrier (carrier device) 58 adjacent to the chopper motor M1, the internal tooth gear 51, the first sun gear 53 and the first planet gears 55. The first carrier 58 extends in a radial direction of the internal tooth gear 51. The first carrier 58 is provided on a center portion (rotation center) thereof with a center hole 59 through which the drive shaft 50 extends to be rotatable relative to the center hole 59. The first carrier 58 is provided on its opposite ends with engagement holes 60 in which the ends of the driven shafts 57 adjacent to the chopper motor M1 are inserted to be rotatable relative to the engagement holes 60, respectively.

The internal tooth gear 51, the first sun gear 53 and the first planet gears 55 constitute a first planetary gear mechanism GM1.

The drive mechanism DM1 is provided with a second carrier (carrier plate) 61 adjacent to the first aperture controlling rotary plate 41. The second carrier 61 is provided on its opposite ends with engagement holes 62 in which the ends of the driven shafts 57 adjacent to the first aperture controlling rotary plate 41 are inserted to be rotatable relative to the engagement holes 62, respectively. The second carrier 61 is provided on a center portion (rotation center) thereof with a circular hole 63, in which a rotary plate support disc (second rotary plate support disc) 64 (shown as a cylindrical member in FIG. 8) is inserted to extend coaxially with the drive shaft 50 and to be rotatable relative to the drive shaft 50 (the second carrier 61 is not shown in FIG. 10). The rotary plate support cylinder 64 is provided on a center portion thereof with an attachment projection 64a having a substantially cylindrical shape which projects rightward as viewed in FIG. 10 in the direction of the axis C of the drive shaft 50. The attachment projection 64a is provided at a center thereof with a circular through-hole 64b. The rotary plate support cylinder 64 is provided, on a center portion of an end surface thereof on the chopper motor M1 side, with a circular recess 64c which is positioned concentrically with the through-hole 64b and is recessed rightward as viewed in FIG. 10 in the direction of the axis C of the drive shaft 50. The drive mechanism DM1 is provided with a second circular sun gear 66 which is arranged coaxially with the first sun gear 53 and has the same diameter as the first sun gear 53. The second sun gear 66 is provided on an outer edge thereof with twenty four external teeth 65 having the same specifications as the external teeth 54 of the first sun gear 53. The second sun gear 66 is provided at one end (the right end as viewed in FIG. 10) thereof with an engaging projecting portion 66a which is coaxially engaged in the circular recess 64c of the rotary plate support cylinder 64. As shown in FIG. 10, the engaging projecting portion 66a of the second circular sun gear 66 and the rotary plate support cylinder 64 are fixed to each other by a set screw 90. The second sun gear 66 is provided at a center thereof with a center hole 67 which is formed as a through-hole to be coaxially communicatively connected with the through-hole 64b of the rotary plate support cylinder 64. The drive shaft 50 extends through the through-hole 64b and the center hole 67 so as to be rotatable relative to the through-hole 64b and the center hole 67. The attachment projection 64a of the rotary plate support cylinder 64 is fitted in the center hole 41b of the first aperture controlling plate 41 to be fixed thereto so that the rotary plate support cylinder 64 and the aperture controlling rotary plate 41 are coaxially positioned. An internal/external tooth gear (second internal tooth gear) 68 coaxial with the second sun gear 66 is provided around the second sun gear 66 and is rotatable about the drive shaft 50. The second internal tooth gear 68 lies in the same plane as the second sun gear 66. The second internal tooth gear 68 is provided on its inner peripheral surface with internal teeth 69 having the same specifications as the internal teeth 52 of the internal tooth gear 51. Furthermore, the drive mechanism DM1 is provided between the internal/external tooth gear 68 and the second sun gear 66 with two second planet gears 70. The planet gears 70 are each provided with external teeth 71 having the same specifications as the external teeth 56 of each first planet gear 55. The planet gears 70 are identical in diameter to the first planet gears 55 and are arranged symmetrically with respect to the second sun gear 66. The driven shafts 57 are rotatably inserted into center holes 70*a* of the second internal tooth gears 70. The external teeth 71 of each second planet gear 70 are in mesh with both the internal teeth 69 of the internal/external tooth gear 68 and the external teeth 65 of the second sun gear 66. The internal/external tooth gear 68 is provided on its entire outer peripheral surface with external teeth 72 at equal pitches. The external teeth 72 are in mesh with external teeth 74 formed on the entire outer peripheral surface of a drive gear 73 at equal pitches. The drive gear 73 is rotated about a rotating shaft 75 thereof by a phase difference motor M2 fixed to the casing 33 of the light source apparatus 30.

The second sun gear 66, the internal/external tooth gear 68 and the second planet gears 70 constitute a second planetary gear mechanism GM2.

As shown in FIG. 10, the drive shaft 50 is provided, at one end thereof on the second aperture controlling rotary plate 42 side (the end of the drive shaft 50 which projects from the through-hole 64*b*), with a coaxial cylinder portion 50*a* which coaxially projects from a major portion of the drive shaft 50. The coaxial cylinder portion 50*a* is smaller in diameter than the major portion of the drive shaft 50, and the axis of the coaxial cylinder portion 50*a* is coincident with the axis C of the drive shaft 50. The coaxial cylinder portion 50*a* is provided therein with an axial hole having its open end on the end surface of the coaxial cylinder portion 50*a*, and an inner peripheral surface of the axial hole is threaded so that the axial hole serves as a female screw hole 50*b*. A base end (the left end as viewed in FIG. 10) of the outer peripheral surface of the coaxial cylinder portion 50*a* is provided as a cylindrical mounting surface 50*c*, and the remaining part of the outer peripheral surface of the coaxial cylinder portion 50*a* from an end (right end as viewed in FIG. 10) of the cylindrical mounting surface 50*c* toward the end of the coaxial cylinder portion 50*a* is formed as an annular tapered surface (truncated conical surface) 50*d* which tapers inward in a direction toward the end of the coaxial cylinder portion 50*a* (the rightward direction as viewed in FIG. 10).

The base end of the coaxial cylinder portion 50*a* is fitted in a circular center hole 92 formed on a center portion of a rotary plate support disc (first rotary plate support disc) 91 so that the entirety of the circular center hole 92 is in surface contact with the cylindrical mounting surface 50*c*. The rotary plate support disc 91 is provided, on a surface thereof on the opposite side of the rotary plate support disc 91 from the rotary plate support disc 64, with a coaxial cylinder portion 93 which projects coaxially with the center hole 92 (i.e., with the drive shaft 50) and which is greater in diameter than the center hole 92. The inner peripheral surface of the coaxial cylinder portion 93 is formed as an annular tapered surface (truncated conical surface) 94, the axis of which being coincident with the axis of the circular center hole 92 and which tapers in a direction away from the end of the coaxial cylinder portion 93 (the leftward direction as viewed in FIG. 10). The outer peripheral surface of the coaxial cylinder portion 93 is formed as a cylindrical surface 95, the axis thereof being coincident with the axis of the circular center hole 92.

The rotary plate support disc 91 is provided, on a surface thereof on the rotary plate support cylinder 64 side, with a circular recess 96 which is positioned concentrically with the center hole 92 and which partly receives the attachment projection 64*a* of the rotary plate support disc 64. The rotary plate support disc 91 is further provided, on a surface thereof on the rotary plate support cylinder 64 side around the circular recess 96, with an annular projection 97 coaxial with the center hole 92. The outer peripheral surface of the annular projection 97 is fitted into the circular center hole 42*b* of the second aperture controlling plate 42 so that the rotary plate support disc 91 and the second aperture controlling plate 42 are concentrically positioned.

An insertion cylindrical portion 101 of a no-phase fixing cylinder 100 is press-fitted into an annular space formed between the coaxial cylinder portion 50*a* and the coaxial cylinder portion 93 that are coaxially arranged. The outer peripheral surface of the insertion cylindrical portion 101 is formed as an annular tapered surface (truncated conical surface) 102, the axis of which is coincident with the axis C of the drive shaft 50 and which is tapered by an angle of tilting identical to that of the annular tapered surface 94. The inner peripheral surface of the insertion cylindrical portion 101 is formed as an annular tapered surface (truncated conical surface) 103, the axis of which is coincident with the axis C of the drive shaft 50 and which is tapered by an angle identical to that of the annular tapered surface 50*d*. Namely, the insertion cylindrical portion 101 is in the shape of a wedge in cross section as shown in FIG. 10. Additionally, the no-phase fixing cylinder 100 is provided with a wall portion 104 which is perpendicular to the axis C of the drive shaft 50, and the wall portion 104 is provided in a center portion thereof with a through-hole 105 having a diameter substantially identical to the diameter of the female screw hole 50*b*.

Accordingly, the insertion cylindrical portion 101, the coaxial cylinder portion 50*a* and the coaxial cylinder portion 93 are coupled together by a press-fitting of the insertion cylindrical portion 101 into the aforementioned annular space formed between the coaxial cylinder portion 50*a* and the coaxial cylinder portion 93 and the surface contacts of the annular tapered surfaces 102 and 103 with the annular tapered surface 94 of the rotary plate support disc 91 and the annular tapered surface 50*d* of the drive shaft 50, respectively, to make the coaxial cylinder portion 50*a* and the coaxial cylinder portion 93 integral with each other via the insertion cylindrical portion 101 (so that the coaxial cylinder portion 50*a* and the coaxial cylinder portion 93 are prevented from both moving relative to each other in the direction of the axis C and rotating relative to each other about the axis C). The wedging forces between the insertion cylindrical portion 101 and the coaxial cylinder portion 50*a* and between the insertion cylindrical portion 101 and the coaxial cylinder portion 93 are increased by increasing the amount of press-fitting of the insertion cylindrical portion 101 toward the chopper motor M1 side, to thereby make the drive shaft 50 and the rotary plate support disc 91 integrated more firmly.

In addition, a cylindrical portion 107 of a cylindrical cover member 106 is fitted on a cylindrical outer surface 95 of the coaxial cylinder portion 93 so that the no-phase fixing cylinder 100, the coaxial cylinder portion 93 and the coaxial cylinder portion 50*a* are covered by the cylindrical cover member 106. The cylindrical cover member 106 is provided with an end wall portion 108 perpendicular to the axis C of the drive shaft 50, and the end wall portion 108 is provided in a center portion thereof with a through-hole 109. A set screw 110 is inserted into the through-hole 109 and the through-hole 105, and a male screw thread 111 of the set screw 110 is screwed into the female screw hole 50*b* to prevent the cylindrical cover member 106 from coming out of the coaxial cylinder portion 93.

The first aperture controlling rotary plate 41 and the second aperture controlling rotary plate 42 that are fixed to the drive mechanism DM1 by the above described structure are assembled onto the drive mechanism DM1 in the following steps.

In reference to FIG. 10, firstly the circular recess 64c of the rotary plate support cylinder 64 is fitted on the engaging projecting portion 66a of the second circular sun gear 66, and the second circular sun gear 66 and the rotary plate support cylinder 64 are fixed to each other by the set screw 90, and the center hole 41b of the first aperture controlling plate 41 is fitted on the attachment projection 64a of the rotary plate support disc 64 to be fixed thereto. In addition, the circular center hole 92 of the rotary plate support disc 91, which is integral with the second aperture controlling plate 42, is fitted on the coaxial cylinder portion 50a of the drive shaft 50 from the right side as viewed in FIG. 10 to bring an inner peripheral surface of the rotary plate support disc 91 into contact with the cylindrical mounting surface 50c. Subsequently, the insertion cylindrical portion 101 of the no-phase fixing cylinder 100 is press-fitted into the annular space formed between the coaxial cylinder portion 50a and the coaxial cylinder portion 93, and additionally, the cylindrical cover member 106 is fitted on the coaxial cylinder portion 93 from the right side as viewed in FIG. 10, and finally, the set screw 110 is screwed into the female screw hole 50b. The amount of engagement of the cylindrical cover member 106 with the coaxial cylinder portion 93 increases as the amount of engagement of the set screw 110 into the female screw hole 50b increases. Moreover, as the amount of screw-engagement of the set screw 110 into the female screw hole 50b increases, the amount of engagement (pushing force) of the insertion cylindrical portion 101 of the no-phase fixing cylinder 100, which is pushed leftward as viewed in FIG. 10 by the cylindrical cover member 106, into the annular space formed between the coaxial cylinder portion 50a and the coaxial cylinder portion 93 increases, i.e., both the binding force between the insertion cylindrical portion 101 and the coaxial cylinder portion 50a and the binding force between the insertion cylindrical portion 101 and the coaxial cylinder portion 93 increase. Accordingly, the amount of engagement (pushing force) of the insertion cylindrical portion 101 of the no-phase fixing cylinder 100 into the aforementioned annular space is adjustable by changing the amount of screw-engagement of the set screw 110 in the female screw hole 50b.

Figure 2:
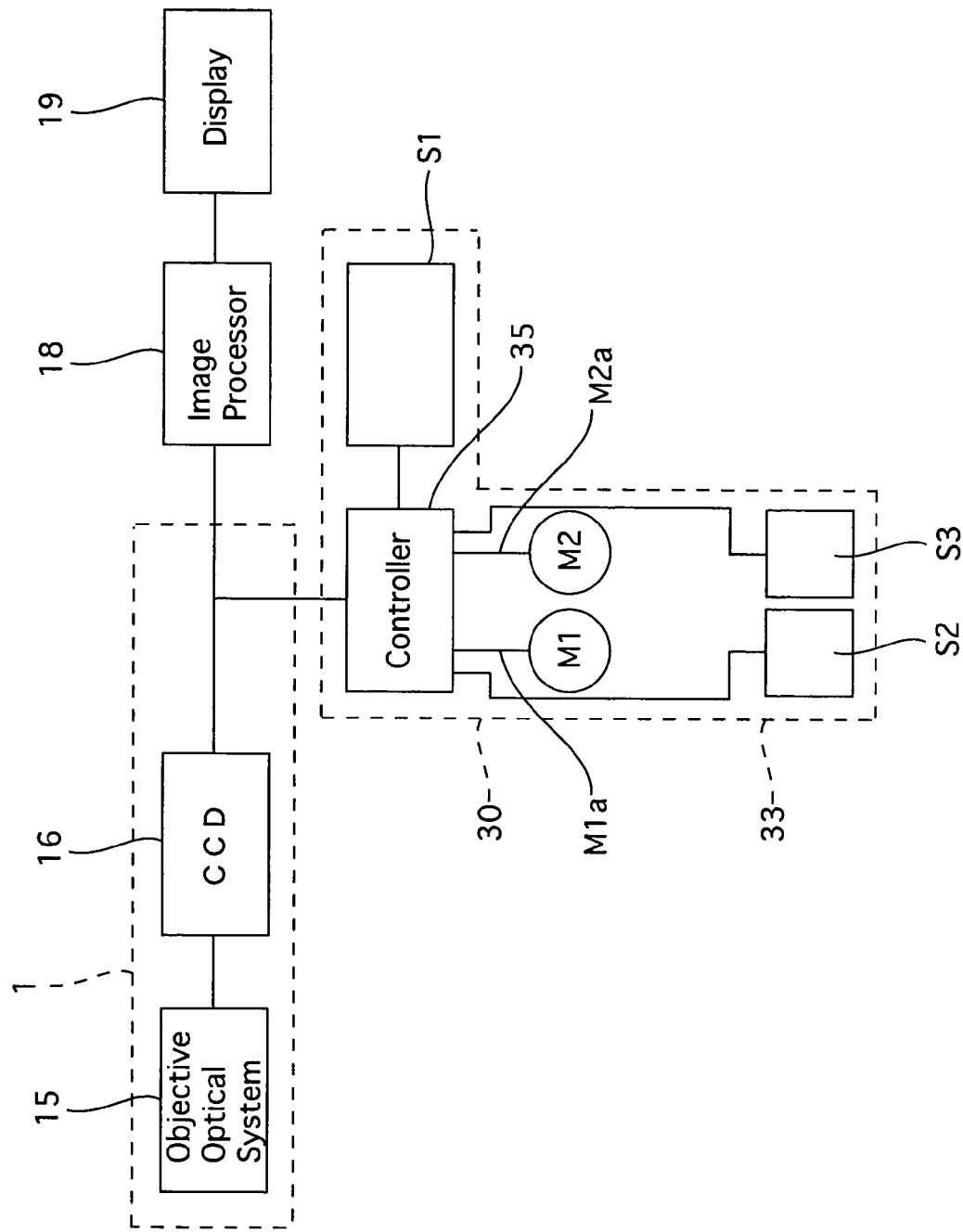
FIG. 2 is a block diagram of the electronic endoscope system shown in FIG. 1.

As shown in FIG. 2, harnesses (electric wires) M1a and M2a extend from the body of the chopper motor M1 and the body of the phase difference motor M2 and are connected to a controller (control device) 35 which includes a CPU (central processing unit) incorporated in the light source apparatus 30. The controller 35 controls operations of the chopper motor M1 and the phase difference motor M2 and calculates the brightness of the object based on a brightness signal supplied from the CCD 16. The light source apparatus 30 is provided therein with an automatic light control switch S1, a chopper motor control button S2 and a phase difference motor control button S3 all of which are connected to the controller 35.

Operations of the drive mechanism DM1 and the rotary shutter 40 will be discussed below with reference mainly to FIGS. 8 and 9.

Although drive forces of the chopper motor M1 and the phase difference motor M2 are transferred to elements of the drive mechanism DM1, only the drive force of the chopper motor M1 will be considered in the first place in the following description for the purpose of making the operation of the drive mechanism DM1 easy to understand.

When the chopper motor M1 is rotated in the clockwise direction, the drive gear 50 and the first sun gear 53 rotate in the clockwise direction at a rotation speed SP1. Thereupon, each of the two first planet gears 55 rotates on the associated driven shaft 57 in the counterclockwise direction while revolving around the drive shaft 50 in the clockwise direction.

At the same time, the second carrier 61 which is synchronized with the first carrier 58 through the driven shafts 57 (i.e., the second carrier 61 is always located at the same phase position as the first carrier 58 with respect to the internal tooth gear 51 and the internal/external tooth gear 68) rotates in the clockwise direction, so that each of the two second planet gears 70 rotates on the associated driven shaft 57 in the counterclockwise direction while revolving about the drive shaft 50 in the clockwise direction. At this time, the rotation speed and the revolution speed of each second planet gear 70 are the same as those of each first planet gear 55. Therefore, the second sun gear 66 rotates in the clockwise direction at the rotation speed SP1.

As can be understood from the foregoing description, the second sun gear 66 obtains the same rotation speed SP1 as the first sun gear 53 from the chopper motor M1. However, the second sun gear 66 rotates at a rotation speed different from the rotation speed SP1 when the drive force of the phase difference motor M2 is transferred to the second sun gear 66. Namely, when the phase difference motor M2 rotates in a rotation direction opposite to the rotation direction of the chopper motor M1 to rotate the internal/external tooth gear 68 in the clockwise direction, the rotational force of the internal/external tooth gear 68 is transferred to the second planet gears 70, so that the rotation speed of each of the two second planet gears 70 on the associated driven shaft 57 in the counterclockwise direction becomes greater than that when each second planet gear 70 is driven only by the drive force of the chopper motor M1. Therefore, the second sun gear 66 in mesh with the second planet gears 70 rotates in the clockwise direction at a rotation speed SP2 higher than the rotation speed SP1 of the first sun gear 53.

When the phase difference motor M2 is rotated in the same direction as the chopper motor M1 (i.e., the clockwise direction), the internal/external tooth gear 68 rotates in the counterclockwise direction, so that the rotation speed of each of the two second planet gears 70 on the associated driven shaft 57 in the counterclockwise direction becomes lower than that when each second planet gear 70 is driven only by the drive force of the chopper motor M1. Consequently, the second sun gear 66 rotates in the clockwise direction at a rotation speed SP3 lower than the rotation speed SP1.

When there is a difference between the rotation speed SP2 (SP3) of the second sun gear 66 and the rotation speed SP1 of the first sun gear 53, a difference in rotation speed occurs between the first aperture controlling rotary plate 41 and the second aperture controlling rotary plate 42, and accordingly, the opening angle θ of each opening portion 40c and 40d gradually vary in the range of 0 to 90 degrees.

Thereafter, if the second aperture controlling rotary plate 42 rotates in the counterclockwise direction relative to the first aperture controlling rotary plate 41 by an amount so that the opening angle θ becomes 0 degrees as shown in FIG. 6, in which the stop pin 42g is engaged with the minimum opening angle defining recess 41k, the opening angle θ is prevented from further decreasing. On the other hand, if the second aperture controlling rotary plate 42 rotates in the clockwise direction relative to the first aperture controlling rotary plate 41 by an amount so that the opening angle θ becomes 90 degrees as shown in FIG. 7, in which the stop pin 42g is engaged with the maximum opening angle defining recess 41m, the opening angle θ is prevented from further increasing.

Automatic and manual light control using the drive mechanism DM1 can be carried out in the light source apparatus 30. When the automatic light control and the manual light control are carried out, the insertion portion 12 of the electronic endoscope 1 is inserted into the patient's body (viewing object) and the viewing site therein is illuminated with the illuminating light emitted from the lamp 31, wherein the controller 35 constantly detects the brightness of the viewing site based on the brightness signal supplied from the CCD 16.

Upon the automatic light control switch S1 being turned ON, the controller 35 which receives a command from the automatic light control switch S1 automatically controls the rotation direction and the rotation speed of the chopper motor M1 and the phase difference motor M2 in accordance with the brightness signal from the CCD 16 to vary the opening angle θ of each opening portion 40c and 40d in the range of 0 to 90 degrees to thereby vary the quantity of illuminating light transmitted through the rotary shutter 40 so that the brightness of the viewing site is always at a desired value.

In the manual light control, the chopper motor control button S2 and the phase difference motor control button S3 are manually operated in a state where the automatic light control switch S1 is OFF.

In this case, firstly the chopper motor M1 and the phase difference motor M2 are rotated by actuating the chopper motor control button S2 and the phase difference control button S3. Thereafter, upon the opening angle θ of each opening portion 40c and 40d becoming a desired value, the phase difference motor M2 is stopped by an operation of the phase difference motor control button S3 so that the opening angle θ of each opening portion 40c and 40d is maintained at the desired value. When the transmission of the drive force from the phase difference motor M2 to the second sun gear 66 is interrupted in this manner so that the second sun gear 66 is rotated only by the chopper motor M1, the first aperture controlling rotary plate 41 and the second aperture controlling rotary plate 42 rotate in the same direction at the same speed while maintaining the desired opening angle θ. Additionally, since the rotation speed of the chopper motor M1 and the phase difference motor M2 can be controlled by operating the chopper motor control button S2 and the phase difference motor control button S3, respectively, an operator (user) can manually and freely control the quantity of illuminating light to be transmitted to the light guide 20.

According to the above described embodiment of the light source apparatus, operations of the chopper motor M1 and the phase difference motor M2 do no have to be controlled so precisely as the prior art because the opening angle θ is mechanically limited to a predetermined range. In other words, although a sensor for detecting the relative rotation angle (phase difference) between the first aperture controlling plate 41 and the second aperture controlling plate 42 is conventionally used to control the operation of a drive device (motor) in accordance with the result of the detection by the sensor, the operation of the drive device needs to be controlled with precision to adjust the opening angle θ precisely to an angle of 0 degrees or 90 degrees in order to prevent the second aperture controlling plate (42) from overshooting the rotational limits thereof with respect to the first aperture controlling plate (41) in a conventional light source apparatus.

Moreover, although the operation of the drive device (motor) needs to be controlled precisely to limit the opening angle θ of the rotary shutter 40 to a predetermined angular range (e.g., a range of 0 to 90 degrees) in a conventional light source apparatus, the opening angle θ of the rotary shutter 40 does not go out of the range of 0 to 90 degrees. even if the operations of the chopper motor M1 and the phase difference motor M2 are not so precisely controlled in the present embodiment because the opening angle θ of the rotary shutter 40 is mechanically limited to a predetermined angular range.

Furthermore, in the present embodiment, the first aperture controlling plate 41 and the second aperture controlling plate 42 can be easily installed with the first aperture controlling plate 41 and the second aperture controlling plate 42 being coaxially arranged (with the rotation axes 41h and 42h being coincident with the axis C of the drive shaft 50). This coaxial arrangement of the first aperture controlling plate 41 and the second aperture controlling plate 42 makes it possible for the stop pin 42g to be engaged and disengaged with and from either of the minimum opening angle defining recess 41k and the maximum opening angle defining recess 41m smoothly with precision when the first aperture controlling plate 41 and the second aperture controlling plate 42 rotate relative to each other.

The main bodies of the chopper motor M1 and the phase difference motor M2 of the drive mechanism DM1 do not rotate, and hence, the harnesses (electric wires) M1a and M2a thereof are not twisted or bent in accordance with rotations of the chopper motor M1 and the phase difference motor M2. Therefore, it is not necessary to provide any specific device for preventing interference of the harnesses M1a and M2a.

Figure 11:
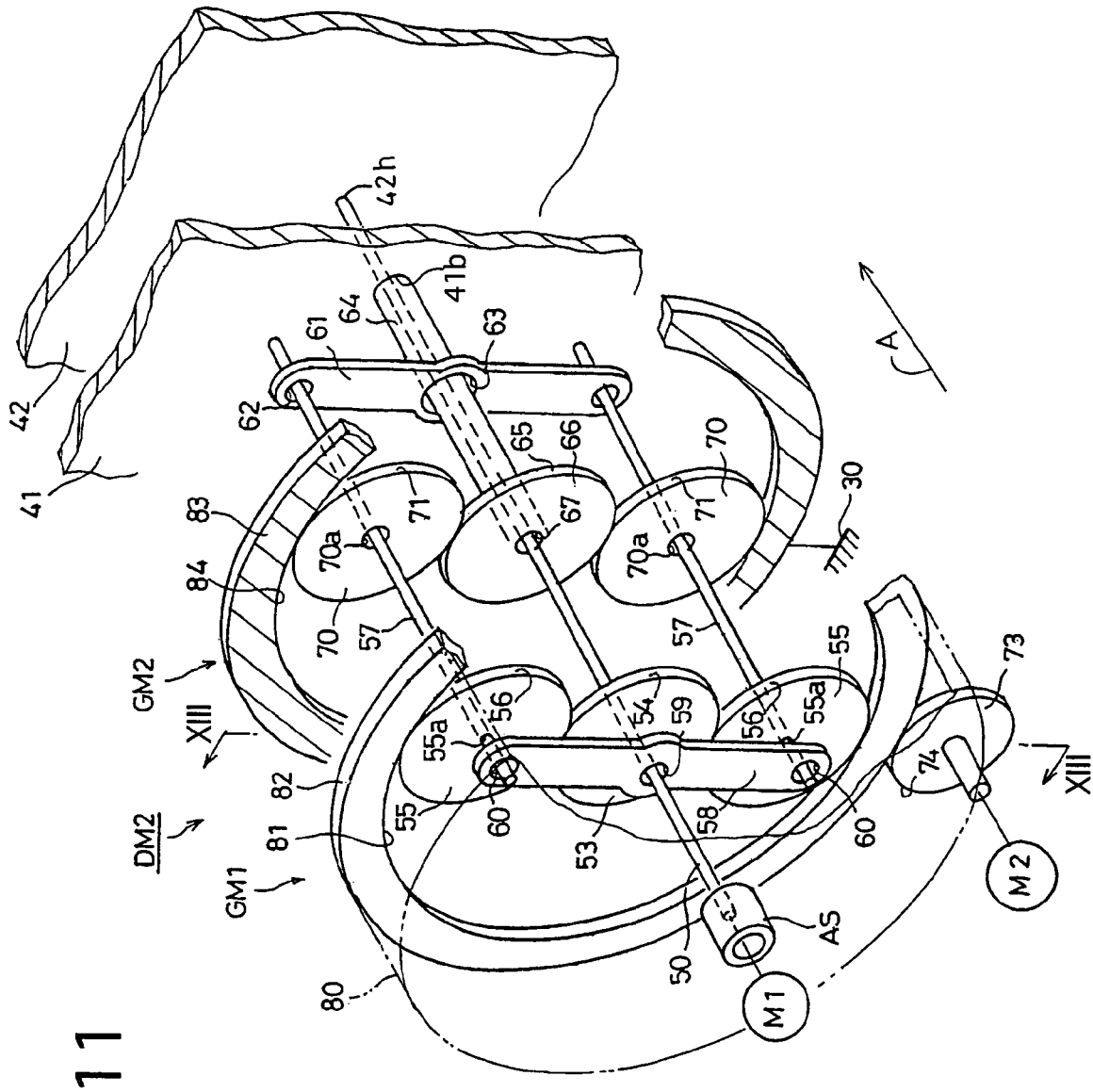
FIG. 11 is a schematic view similar to that of FIG. 8, showing a drive mechanism for driving the rotary shutter shown in FIG. 5 in a second embodiment of the light source apparatus according to the present invention.
Figure 12:
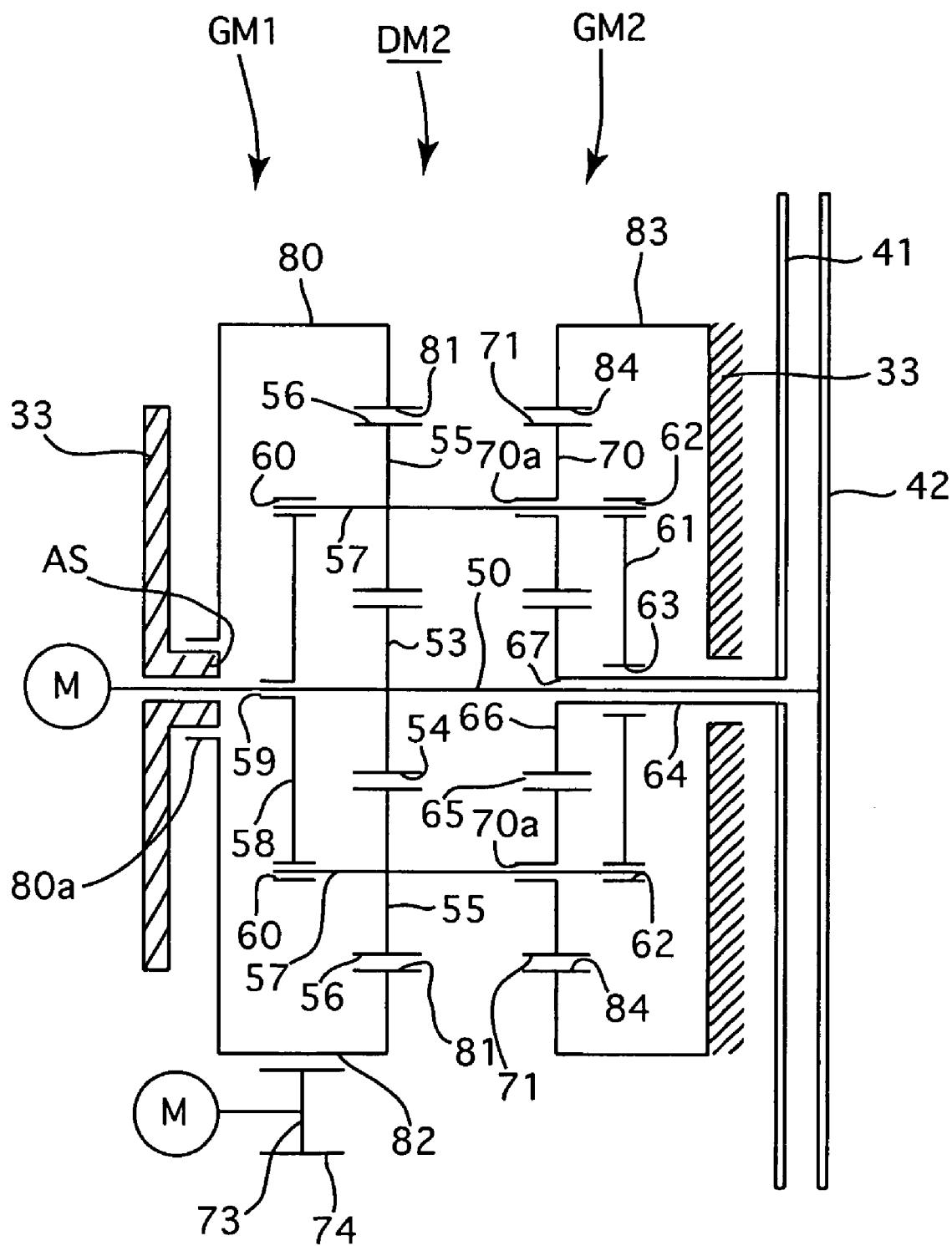
FIG. 12 is a view similar to that of FIG. 9, showing the drive mechanism shown in FIG. 11 and elements on the periphery thereof.

A second embodiment of the light source apparatus according to the present invention will be hereinafter discussed with reference mainly to FIGS. 11 through 13.

The second embodiment of the light source apparatus is different from the first embodiment of the light source apparatus only in the drive mechanism DM2, and accordingly, the elements corresponding to those in the first embodiment are designated by like reference numerals and no detailed explanation thereof will be given below.

A stationary bearing (gear bearing) AS secured to the casing 33 of the light source apparatus 30 is provided around the drive shaft 50 and the drive shaft of the chopper motor M1. The stationary bearing AS is in the form of a cylinder having open ends and is positioned to be coaxial with the drive shaft 50 and the drive shaft of the chopper motor M1. The second embodiment of the light source apparatus is provided, instead of the internal tooth gear 51 and the internal/external tooth gear 68 in the first embodiment of the light source apparatus, with an internal/external tooth gear (first internal tooth gear) 80 and an internal tooth gear (second internal tooth gear) 83, respectively. The internal/external tooth gear 80 is substantially cylindrical and is provided, on its end wall on the chopper motor M1 side, with a central cylindrical fitting portion 80a (see FIG. 13) coaxial with the drive shaft 50 and integral with the internal/external tooth gear 80. The stationary bearing AS is fitted in the cylindrical fitting portion 80a so as to relatively rotate about the drive shaft 50. Note that the inner diameter of the cylindrical fitting portion 80a is substantially the same as the outer diameter of the stationary bearing AS. The internal/external tooth gear 80 is identical in diameter to the internal tooth gear 51 shown in FIGS. 8 and 9 of the first embodiment. The internal/external tooth gear 80 is provided, on its end surface on the first aperture controlling rotary plate 41 side, with a circular opening coaxial with the drive shaft 50. Internal teeth 81 identical to the internal teeth 52 of the internal tooth gear 51 are formed along the entire inner peripheral surface of the circular opening of the internal/external tooth gear 80. External teeth 82 identical to the external teeth 72 of the second internal tooth gear 68 of the first embodiment (shown in FIGS. 8 and 9) are formed entirely on an annular end portion of the outer peripheral surface of the internal/external tooth gear 80 on the first aperture controlling rotary plate 41 side. The phase difference motor M2 is secured to the casing 33 of the light source apparatus 30. The external teeth 74 of the drive gear 73 which is driven by the phase difference motor M2 are in mesh with the external teeth 82.

The internal tooth gear 83 has a diameter identical to the diameter of the internal/external tooth gear 68 shown in FIGS. 8 and 9 of the first embodiment. The internal tooth gear 83 is provided on its inner peripheral surface with internal teeth 84 identical to the internal teeth 69 of the internal/external tooth gear 68 and coaxial with the second sun gear 66. The internal tooth gear 83 is secured to the casing 33 of the light source apparatus 30 and is therefore non-rotatable. The internal tooth gear 83 is hatched in FIG. 11 to indicate that it is a stationary member.

In the second embodiment of the light source apparatus, the internal/external tooth gear 80, the first sun gear 53, and the first planet gears 55 constitute the first planetary gear mechanism GM1, and the second sun gear 66, the internal/external tooth gear 83 and the second planet gears 70 constitute the second planetary gear mechanism GM2.

The rotating actions of the first aperture controlling rotary plate 41 and the second aperture controlling rotary plate 42 will be discussed hereinafter.

Firstly, the following explanation will be applied to the case when the automatic light control switch S1 is turned ON.

When the controller 35 drives the chopper motor M1 in accordance with the brightness signal supplied from the CCD 16, the rotation of the chopper motor M1 is transferred to the second sun gear 66 through the same route as that in the first embodiment of the light source apparatus, so that the first sun gear 53, the second sun gear 66 and the second aperture controlling rotary plate 42 all rotate at the speed SP1. If the controller 35 drives the phase difference motor M2 in a direction opposite to the chopper motor M1 in accordance with the brightness signal supplied from the CCD 16, the internal/external tooth gear 80 rotates in a direction opposite to the rotation direction of each first planet gear 55, so that the rotation speed of each first planet gear 55 increases. As a result, the first sun gear 53 and the drive shaft 50 rotate at the rotation speed SP2 that is higher than the rotation speed SP1 of the second sun gear 66. Thereupon, a difference in rotation speed is produced between the first aperture controlling rotary plate 41 and the second aperture controlling rotary plate 42, which varies the opening angle θ of each opening portion 40c and 40d in the range of 0 to 90 degrees, so that the quantity of illuminating light to be transmitted through the rotary shutter 40 is automatically changed to provide a desired brightness of the viewing site.

On the other hand, if the controller 35 rotates the phase difference motor M2 in the same direction as the chopper motor M1 in accordance with the brightness signal supplied from the CCD 16, the rotation direction of the internal/external tooth gear 80 becomes identical to the rotation direction of each first planet gear 55, so that the rotating speed of each first planet gear 55 becomes lower than that obtained when the phase difference motor M2 is stopped. Consequently, the rotation speed SP3 of the first sun gear 53 and the drive shaft 50 becomes lower than the rotation speed SP1. Thereupon, a difference in rotation speed is produced between the first aperture controlling rotary plate 41 and the second aperture controlling rotary plate 42, which varies the opening angle θ of the opening portions 40c and 40d in the range of 0 to 90 degrees, so that the quantity of illuminating light to be transmitted through the rotary shutter 40 is automatically changed to provide a desired brightness to the viewing site.

In the second embodiment of the light source apparatus, the manual light control can also be carried out if the chopper motor control button S2 and the phase difference motor control button S3 are operated in a state where the automatic light control switch S1 is OFF.

Firstly the chopper motor control button S2 and the phase difference motor control button S3 are manually operated to rotate the chopper motor M1 and the phase difference motor M2. Upon the opening angle θ of each opening portion 40c and 40d becoming a desired value, the phase difference motor control button S3 is operated to stop the phase difference motor M2. Thereafter, the first sun gear 53 is rotated only by the chopper motor M1. If the phase difference motor M2 is stopped in this manner to stop the internal/external tooth gear 80 so that the drive mechanism DM2 operates only by the drive force of the chopper motor M1, the first sun gear 53 and the second sun gear 66 rotate in the same direction at the same rotation speed SP1, and the first aperture controlling rotary plate 41 and the second aperture controlling rotary plate 42 rotate in the same direction while maintaining the desired opening angle θ. Accordingly, an operator (user) can freely manually adjust the quantity of illuminating light to be transmitted to the light guide 20.

In the second embodiment of the light source apparatus, effects similar to those in the first embodiment of the light source apparatus can be obtained. Moreover, as the stationary bearing AS supports the cylindrical fitting portion 80a of the internal/external tooth gear 80 to allow the cylindrical fitting portion 80a to rotate freely, the weight of the internal/external tooth gear 80 is not applied to the drive shaft 50. Therefore, the load applied to the drive shaft 50 or the chopper motor M1 can be reduced in comparison with the drive mechanism DM1 in the first embodiment of the light source apparatus in which the weight of the internal/external tooth gear 68 is applied to the drive shaft 50 through the second planet gears 70.

Figure 14:
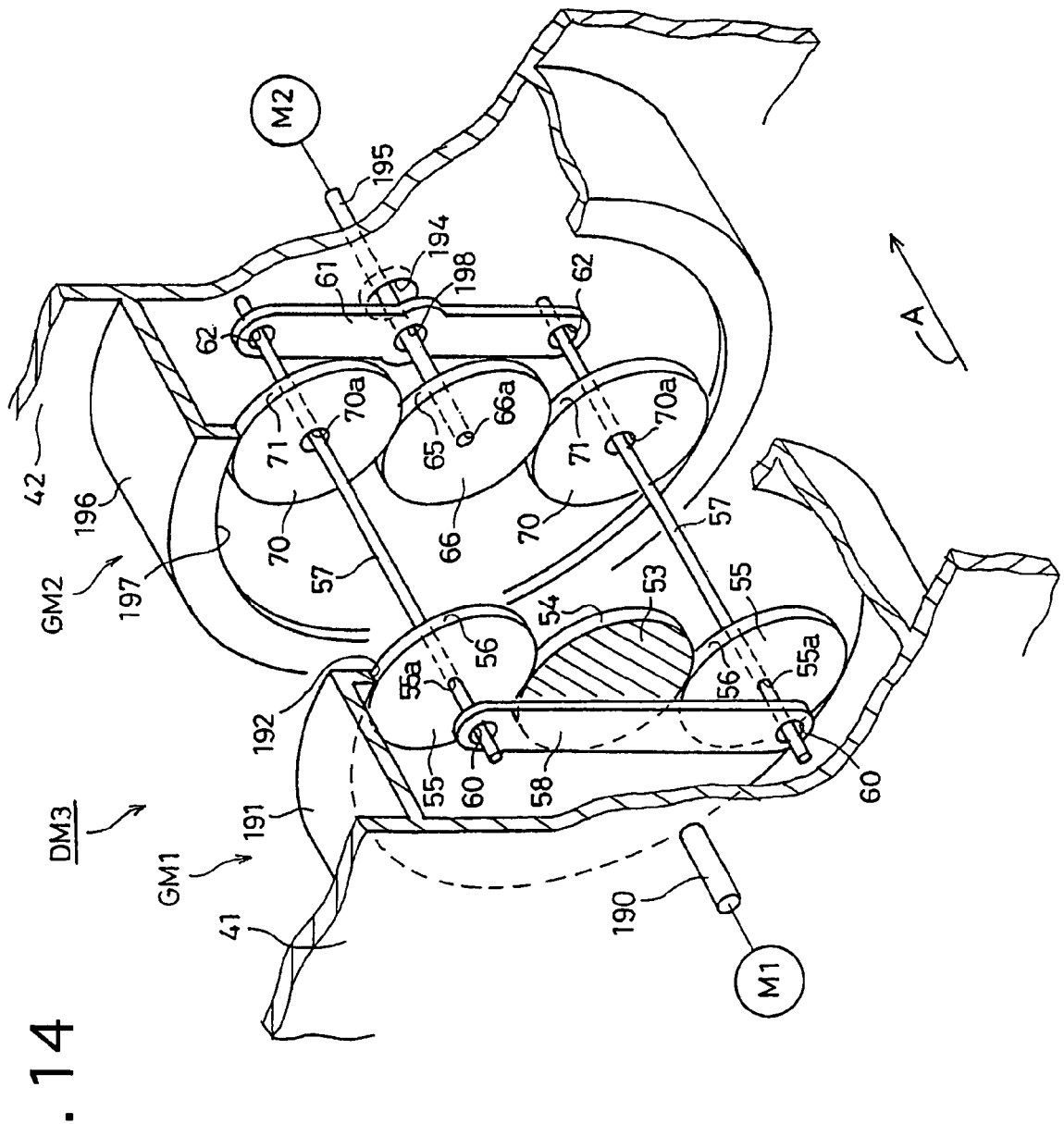
FIG. 14 is a schematic view similar to that of FIG. 8, showing a drive mechanism for driving the rotary shutter shown in FIG. 5 in a third embodiment of the light source apparatus according to the present invention.
Figure 15:
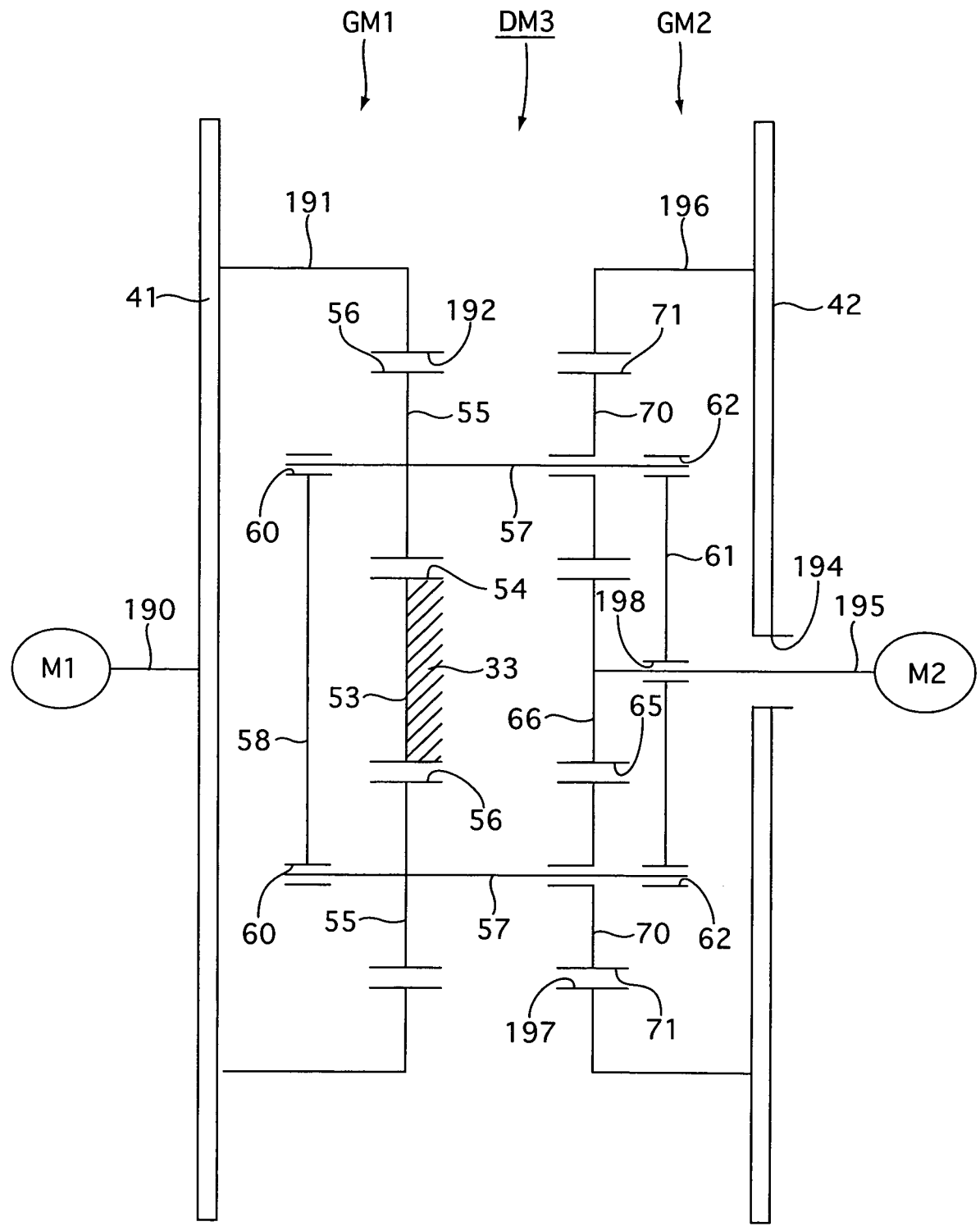
FIG. 15 is a view similar to that of FIG. 9, showing the drive mechanism shown in FIG. 14 and elements on the periphery thereof.

A third embodiment of the light source apparatus according to the present invention will be discussed below with reference mainly to FIGS. 14 and 15. The elements corresponding to those in the first embodiment of the light source apparatus are designated by like reference numerals, and no detailed explanation thereof will be given.

The drive mechanism DM3 in the third embodiment of the light source apparatus is constructed as follows.

A drive shaft (rotating shaft) 190 is fixed to the first aperture controlling rotary plate 41 at the center thereof to extend perpendicular to the first aperture controlling rotary plate 41 (parallel with the light axis 31a). The drive shaft 190 is rotated on the axis thereof by the chopper motor M1 that is secured to the casing 33 of the light source apparatus 30. The first aperture controlling rotary plate 41 is provided, on its surface opposed to the second aperture controlling rotary plate 42 (opposite to the drive shaft 190), with a first internal/external tooth gear (first internal tooth gear) 191, which is substantially in the form of a cylinder coaxial with the drive shaft 190. An end surface of the first internal tooth gear 191 on the second aperture controlling rotary plate 42 side is provided with a circular opening coaxial with the drive shaft 190. An internal tooth gear 192 identical to the internal tooth gear 52 (see FIG. 8) is formed along the circular opening. The first sun gear 53 secured to the casing 33 of the light source apparatus 30 is arranged coaxially with the internal tooth gear 192 in the circular opening of the first internal tooth gear 191. The first sun gear 53 is hatched in FIG. 14 to indicate that the first sun gear 53 is a stationary member. The first sun gear 53 in the third embodiment of the light source apparatus has no center hole unlike the first sun gear 53 in the first embodiment of the light source apparatus. The external teeth 54 of the first sun gear 53 and the internal teeth 192 of the first internal/external tooth gear 191 are in mesh with the external teeth 56 of the two first planet gears 55. The two first planet gears 55 are arranged symmetrically with respect to the first sun gear 53. The driven shafts 57 extending through (secured to) the first planet gears 55 are interconnected at the ends thereof adjacent to the chopper motor M1 by the first carrier 58. Unlike the first carrier 58 in the first embodiment of the light source apparatus, the first carrier 58 in the third embodiment of the light source apparatus has no center hole corresponding to the center hole 59 of the first carrier 53 in the first embodiment of the light source apparatus.

The second aperture controlling rotary plate 42 is provided on its center with a circular through-hole 194 through which a drive shaft (rotating shaft) 195 coaxial with the drive shaft 190 (parallel with the optical axis 31a) extends. The drive shaft 195 is connected, at the end thereof opposite to the chopper motor M1, to the phase difference motor M2 secured to the casing 33 of the light source apparatus 30, so that the drive shaft 195 is driven on its axis by the phase difference motor M2. The other end of the drive shaft 195 opposite to the phase difference motor M2 is fitted and secured to the center mount hole 66a formed in the second sun gear 66. The second aperture controlling rotary plate 42 is provided, on its end surface adjacent to the first aperture controlling rotary plate 41, with a substantially cylindrical second internal/external tooth gear (second internal tooth gear) 196 coaxial with the first internal/external tooth gear 191. The second internal/external tooth gear 196 is provided on its end face adjacent to the first aperture controlling rotary plate 41 with a circular opening which is coaxial with the drive shaft 195. Internal teeth 197 identical to the internal teeth 192 are formed along the circular opening of the second internal/external tooth gear 196. The external teeth 65 of the second sun gear 66 and the internal teeth 197 of the second internal/external tooth gear 196 are in mesh with the external teeth 71 of the two second planet gears 70. The two second planet gears 70 are arranged symmetrically with respect to the second sun gear 66. The two driven shafts 57 relatively rotatably extend through the center holes 70a of the two second planet gears 70, respectively. The ends of the driven shafts 57 on the phase difference motor M2 side are interconnected by the second carrier 61. The second carrier 61 is provided on its center (rotation center) with a circular through-hole (rotation center hole) 198 in which the drive shaft 195 relatively rotatably extends.

In the third embodiment of the light source apparatus, the first internal/external tooth gear 191, the first sun gear 53 and the first planet gears 55 constitute the first planetary gear mechanism GM1, and the second sun gear 66, the second internal/external tooth gear 196 and the second planet gears 70 constitute the second planetary gear mechanism GM2.

The operation of the drive mechanism DM3 and the rotating actions of the first aperture controlling rotary plate 41 and the second aperture controlling rotary plate 42 will be discussed hereinafter.

Firstly, the following explanation will be applied when the automatic light control switch S1 is turned ON.

When the controller 35 drives the chopper motor M1 in accordance with the brightness signal supplied from the CCD 16, the first internal/external tooth gear 191 rotates at the rotation speed SP1, and each of the two first planet gears 55 revolves in the same direction as the first internal/external tooth gear 191 while rotating on the associated driven shaft 57 in a direction opposite to the rotation direction of the first internal/external tooth gear 191. Consequently, each second planet gear 70 rotates on the associated driven shaft 57 at the same rotation speed and direction as each first planet gear 55 and revolves around the second sun gear 66 in the same revolving speed and direction as each first planet gear 55, and the second internal/external tooth gear 196 rotates in the same direction as the first internal/external tooth gear 191 at the rotation speed SP1.

If the controller 35 rotates the phase difference motor M2 in the same direction as the chopper motor M1 in accordance with the brightness signal supplied from the CCD 16, the rotation speed of each second planet gear 70 on the associated driven shaft 57 increases because the second sun gear 66, which is stationary when only the chopper motor M1 is driven, is rotated. As a result, the second internal/external tooth gear 196 rotates in the same direction as the first internal/external tooth gear 191 at a rotation speed SP2 higher than the rotation speed SP1. Consequently, a difference in rotation speed is produced between the first aperture controlling rotary plate 41 and the second aperture controlling rotary plate 42, which varies the opening angle θ of the opening portions 40c and 40d in the range of 0 to 90 degrees, so that the quantity of illuminating light to be transmitted through the rotary shutter 40 is automatically changed to provide a desired brightness to the viewing site.

On the other hand, if the controller 35 drives the phase difference motor M2 in a direction opposite to the chopper motor M1 in accordance with the brightness signal supplied from the CCD 16 to thereby rotate the second sun gear 66 in the same direction as the rotation direction of each second planet gear 70 on the associated driven shaft 57, the rotation speed of each second planet gear 70 decreases. As a result, the second internal/external tooth gear 196 rotates at a rotation speed SP3 lower than the rotation speed SP1 in the same direction as the first internal/external tooth gear 191. Consequently, a difference in rotation speed is produced between the first aperture controlling rotary plate 41 and the second aperture controlling rotary plate 42, which varies the opening angle θ of the opening portions 40c and 40d in the range of 0 to 90 degrees, so that the quantity of illuminating light to be transmitted through the rotary shutter 40 is automatically changed to provide a desired brightness to the viewing site.

In the third embodiment of the light source apparatus, the manual light control can also be carried out if the chopper motor control button S2 and the phase difference motor control button S3 are operated in a state where the automatic light control switch S1 is OFF. Firstly the chopper motor control button S2 and the phase difference motor control button S3 are manually operated to rotate the chopper motor M1 and the phase difference motor M2. Upon the opening angle θ of each opening portion 40c and 40d becoming a desired value, the phase difference motor control button S3 is operated to stop the phase difference motor M2. Thereafter, the first internal/external tooth gear 191 and the second internal/external tooth gear 196 are rotated only by the chopper motor M1. If the phase difference motor M2 is stopped in this manner to stop the second sun gear 66, the first internal/external tooth gear 191 and the second internal/external tooth gear 196 rotate in the same direction at the same rotation speed by the chopper motor M1. Consequently, the first aperture controlling rotary plate 41 and the second aperture controlling rotary plate 42 rotate while maintaining the desired opening angle θ. Accordingly, an operator (user) can freely manually adjust the quantity of illuminating light to be transmitted to the light guide 20.

Effects similar to those in the first embodiment of the light source apparatus can be obtained in the third embodiment of the light source apparatus.

Although the present invention has been discussed above with reference to each of the above described first through third embodiments of the light source apparatuses, the present invention is not limited to these embodiments and can be modified without departing from the spirit of the present invention.

Figure 16:
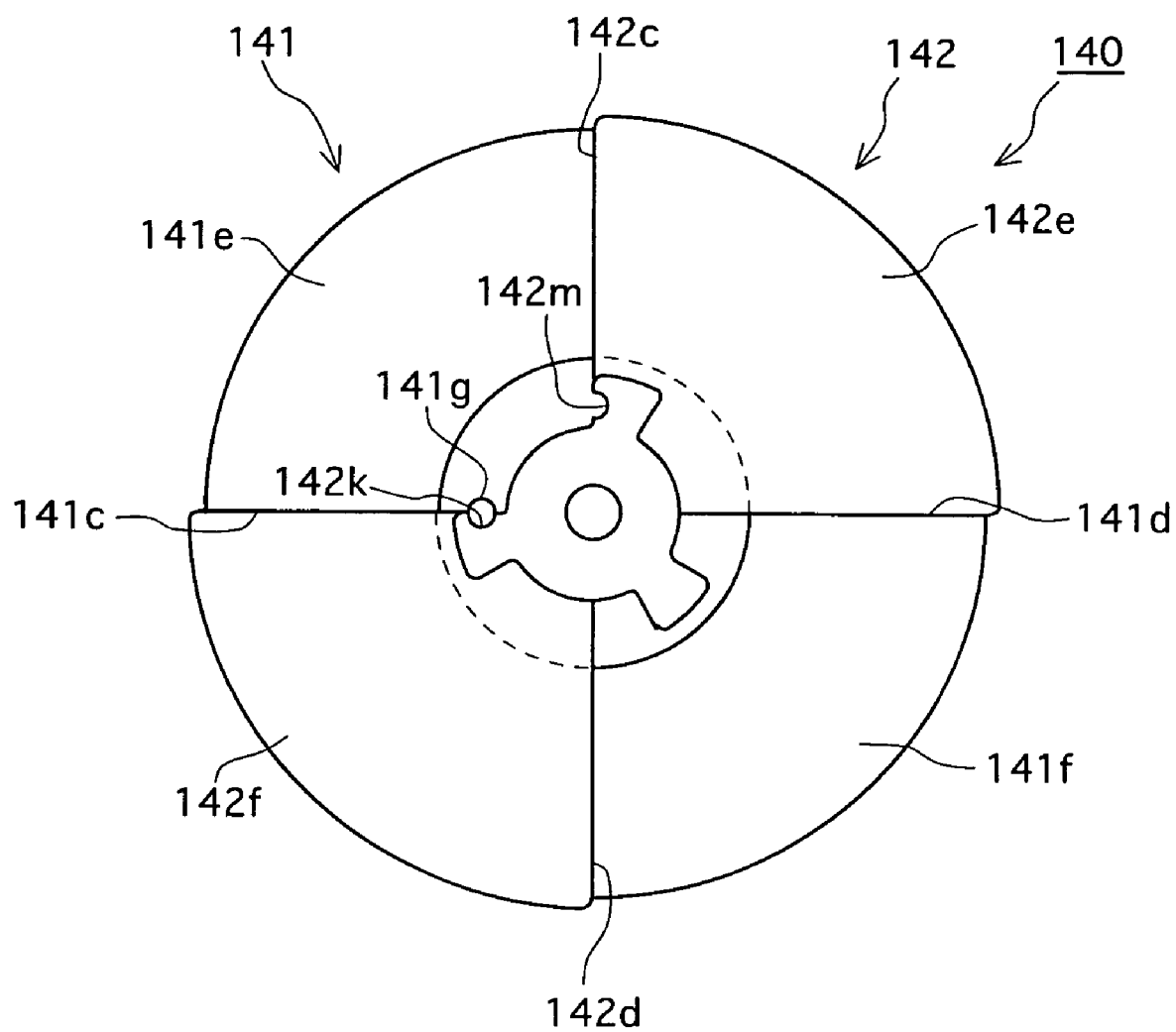
FIG. 16 is a view similar to FIG. 6, showing a front elevational view of a modified embodiment of the rotary shutter.

For instance, as shown in FIG. 16, a stop pin 141g can be provided on a first aperture controlling rotary plate 141 having the same construction as that of the second aperture controlling plate 42 of FIG. 6, while a minimum opening angle defining recess 142k and a maximum opening angle defining recess 142m can be provided on a second aperture controlling rotary plate 142 having the same construction as that of the first aperture controlling plate 41 of FIG. 6.

Figure 13:
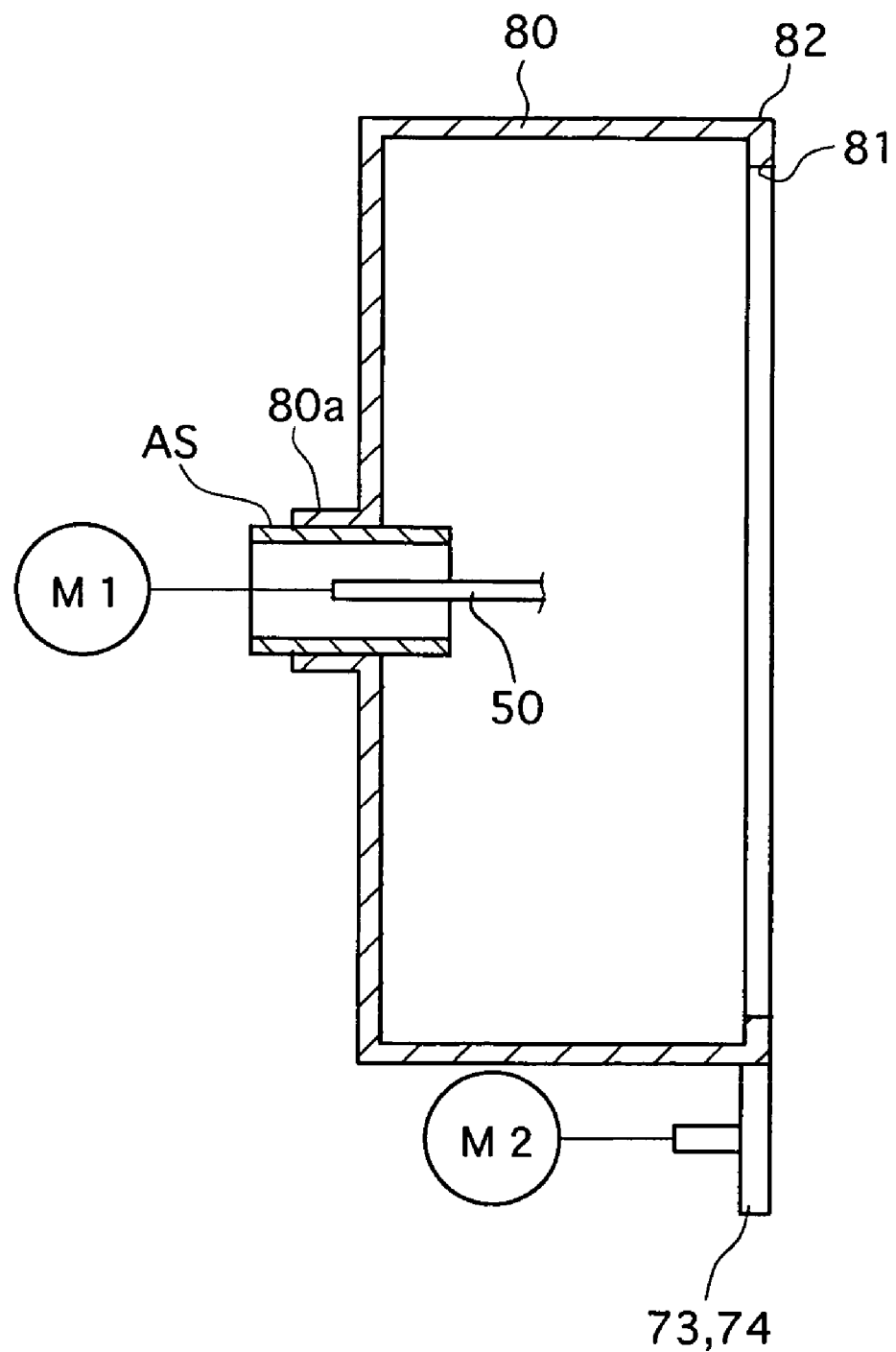
FIG. 13 is a cross sectional view taken along XIII-XIII line shown in FIG. 11.

In addition, in the first embodiment of the light source apparatus, the internal/external tooth gear 68 may be substantially in the form of a cylinder similar to the internal/external tooth gear 80 in the second embodiment shown in FIG. 13, so that the cylindrical fitting portion thereof (corresponding to the cylindrical fitting portion 80a) can be rotatably supported by a stationary bearing AS which is positioned around either the rotary cylinder 64 or the second sun gear 66 (which is fixed to the casing 33 of the light source apparatus 30). In this alternative, the weight of the internal/external tooth gear 68 is not applied to the drive shaft 50 through the second planet gears 70, and hence, the load applied to the drive shaft 50 or the chopper motor M1 can be reduced.

Furthermore, in the third embodiment of the light source apparatus, it is possible for the first aperture controlling rotary plate 41 and the second aperture controlling rotary plate 42 to be provided integrally with two cylindrical fitting portions, so that the two cylindrical fitting portions (which correspond to the cylindrical fitting portion 80a of the second embodiment shown in FIG. 13) can be rotatably supported by two stationary bearings AS which are positioned around the drive shaft 190 and the drive shafts 195, respectively in the same manner as the stationary bearing AS is positioned around the drive shaft 50 in the second embodiment, as shown in FIG. 13. In this alternative, the weights of the first internal/external tooth gear 191 and the second internal/external tooth gear 196 are not applied to the drive shaft 190 and the drive shaft 195 through the first planet gears 55 and the second planet gears 70, respectively, and accordingly, the load applied to the drive shaft 190, the drive shaft 195, the chopper motor M1 and the phase difference motor M2 can be reduced.

According to the above description, an improved light source apparatus for an electronic endoscope can be achieved, wherein the range of relative rotation angle between the pair of aperture controlling rotary plates can be easily limited to a predetermined rotation angle range and rotations of the pair of aperture controlling rotary plates can be easily controlled. The present invention further provides an endoscope having such a light source apparatus.

Moreover, the present invention provides a light source apparatus for an electronic endoscope, wherein the pair of aperture controlling rotary plates can easily be assembled in a manner to be arranged coaxial with each other, and further provides an electronic endoscope having such a light source apparatus.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A light source apparatus for an electronic endoscope comprising:
   a light source;
   a rotary shutter for intercepting or emitting light emitted from said light source toward a light guide, said rotary shutter including a pair of aperture controlling rotary plates having axes coaxial with each other and extending parallel with an optical axis of said light source, which are selectively rotatable one of relative to and together with each other and each includes light interception portions and opening portions alternately arranged in a rotation direction, wherein a combined opening angle of said opening portions of said rotary shutter is varied by a relative rotation of said pair of aperture controlling rotary plates, wherein the amount of said light emitted from said light source is controlled by varying said combined opening angle, and wherein said controlled amount of said light is emitted through said rotary shutter by integral rotation of said pair of aperture controlling rotary plates; and
   a mechanical stop device, positioned between said pair of aperture controlling rotary plates, for limiting the range of relative rotation angle between said pair of aperture controlling rotary plates to a predetermined range from a maximum opening angle to a minimum opening angle.

2. The light source apparatus according to claim 1, wherein said mechanical stop device comprises:
   a minimum opening angle defining recess and a maximum opening angle defining recess which are formed on one of said pair of aperture controlling rotary plates; and
   a stop pin which projects from the other of said pair of aperture controlling rotary plates to be selectively engageable with said minimum opening angle defining recess and said maximum opening angle defining recess,
   wherein said minimum opening angle is defined by engagement of said stop pin with said minimum opening angle defining recess, and
   wherein said maximum opening angle is defined by engagement of said stop pin with said maximum opening angle defining recess.

3. The light source apparatus according to claim 1, further comprising:
   a first planetary gear mechanism including a first internal tooth gear coaxial with said rotation axis of said rotary shutter, a first sun gear coaxial with an axis of said first internal tooth gear, and at least one first planet gear which is simultaneously engaged with said first internal tooth gear and said first sun gear;
   a second planetary gear mechanism including a second internal tooth gear identical to said first internal tooth gear and coaxial with said rotation axis of said rotary shutter, a second sun gear identical to said first sun gear and coaxial with an axis of said second internal tooth gear, and at least one second planet gear, identical to said first planet gear, which is simultaneously engaged with said second internal tooth gear and said second sun gear; and
   a carrier device which is rotatable about an axis coincident with said rotation axis of said rotary shutter, wherein said carrier device holds said first and second planet gears in a same phase position with respect to said first and second internal tooth gears, and supports said first and second planet gears to allow said first and second planet gears to rotate relative to each other,
   wherein one of said first sun gear and said first internal tooth gear of said first planetary gear mechanism is non-rotatably fixed, and the other of said first sun gear and said first internal tooth gear is rotated together with one of said aperture controlling rotary plates by a motor, and one of said second sun gear and said second internal tooth gear of said second planetary gear mechanism is driven together with the other of said aperture controlling rotary plates by a phase difference motor.

4. The light source apparatus according to claim 1, further comprising:
a first planetary gear mechanism including a first internal tooth gear coaxial with said rotation axis of said rotary shutter, a first sun gear coaxial with an axis of said first internal tooth gear, and at least one first planet gear which is simultaneously engaged with said first internal tooth gear and said first sun gear;
a second planetary gear mechanism including a second internal tooth gear identical to said first internal tooth gear and coaxial with said rotation axis of said rotary shutter, a second sun gear identical to said first sun gear and coaxial with an axis of said second internal tooth gear, and at least one second planet gear, identical to said first planet gear, which is simultaneously engaged with said second internal tooth gear and said second sun gear; and
a carrier device which is rotatable about an axis coincident with said rotation axis of said rotary shutter, wherein said carrier device holds said first and second planet gears in a same phase position with respect to said first and second internal tooth gears, and supports said first and second planet gears to allow said first and second planet gears to rotate relative to each other,
wherein said second internal tooth gear is non-rotatably fixed,
wherein said second sun gear and one of said aperture controlling rotary plates are rotated together,
wherein said first sun gear and the other of said aperture controlling rotary plates are driven by a motor, and
wherein the first internal tooth gear is driven by a phase difference motor.

5. An electronic endoscope having said light source apparatus according to claim 1, further comprising:
an operating portion; and
an insertion portion extending from said operating portion and inserted into an object to be viewed,
wherein said light guide is inserted in said operating portion and said insertion portion so that a distal end of said light guide extends to a distal end of said insertion portion, and
wherein said light source emits illuminating light to said light guide.

6. A light source apparatus for an electronic endoscope comprising:
a light source;
a rotary shutter for intercepting or emitting light emitted from said light source toward a light guide, said rotary shutter including a pair of aperture controlling rotary plates having axes coaxial with each other and extending parallel with an optical axis of said light source, which are selectively rotatable one of relative to and together with each other and each includes light interception portions and opening portions alternately arranged in a rotation direction, wherein a combined opening angle of said opening portions of said rotary shutter is varied by a relative rotation of said pair of aperture controlling rotary plates, wherein the amount of said light emitted from said light source is controlled by varying said combined opening angle, and wherein said controlled amount of said light is emitted through said rotary shutter by integral rotation of said pair of aperture controlling rotary plates;
a central rotating shaft driven to rotate;
a first rotary plate support disc to which one of said pair of aperture controlling rotary plates is fixed, said first rotary plate support disc including a coaxial cylinder portion coaxial with said central rotating shaft;
a second rotary plate support disc to which said other of said pair of aperture controlling rotary plates is fixed, said second rotary plate support disc being freely rotatable with respect to said central rotating shaft; and
a no-phase fixing cylinder fitted into an annular space formed between said central rotating shaft and said coaxial cylinder portion of said first rotary plate support disc to make said central rotating shaft and said coaxial cylinder portion integral with each other in said rotation direction,
wherein said no-phase fixing cylinder includes an insertion portion having a substantially wedge shape in cross section taken along a plane on which an axis of said no-phase fixing cylinder lies, and
wherein each of said central rotating shaft and said coaxial cylinder portion of said first rotary plate support disc has a cross sectional shape allowing surface contact with said insertion portion of said no-phase fixing cylinder when said no-phase fixing cylinder is fitted into said annular space.

7. The light source apparatus according to claim 6, wherein a surface of said central rotating shaft which comes in surface contact with said no-phase fixing cylinder comprises an annular tapered surface which is tapered by an angle identical to a taper angle of an associated contacting surface of said no-phase fixing cylinder, and
wherein a surface of said coaxial cylinder portion which comes in surface contact with said no-phase fixing cylinder comprises an annular tapered surface which is tapered by an angle identical to a taper angle of an associated contacting surface of said no-phase fixing cylinder.

8. An electronic endoscope having said light source apparatus according to claim 6, further comprising:
an operating portion; and
an insertion portion extending from said operating portion and inserted into an object to be viewed,
wherein said light guide is inserted in said operating portion and said insertion portion so that a distal end of said light guide extends to a distal end of said insertion portion, and
wherein said light source emits illuminating light to said light guide.

9. The light source apparatus according to claim 6, further comprising a cylindrical cover member for pushing said no-phase fixing cylinder into said annular space.

10. The light source apparatus according to claim 9, wherein said pushing force is adjusted by adjusting the amount of screw-engagement of a set screw for fixing said cylindrical cover member to an end of said central rotating shaft.

11. The light source apparatus according to claim 6, further comprising a mechanical stop device, positioned between said pair of aperture controlling rotary plates, for limiting the range of relative rotation angle between said pair of aperture controlling rotary plates to a predetermined range from a maximum opening angle to a minimum opening angle.

12. The light source apparatus according to claim 11, wherein said mechanical stop device comprises:
a minimum opening angle defining recess and a maximum opening angle defining recess which are formed on one of said pair of aperture controlling rotary plates at respective positions a same radial distance away from said rotation axis; and a stop pin which projects from the other of said pair of aperture controlling rotary plates to be selectively engageable with said minimum opening angle defining recess and said maximum opening angle defining recess, said stop pin being positioned at a point a predetermined distance away from said rotation axis, said predetermined distance being identical to a distance between said rotation axis and either of said minimum opening angle defining recess and said maximum opening angle defining recess, wherein said minimum opening angle is defined by engagement of said stop pin with said minimum opening angle defining recess, and wherein said maximum opening angle is defined by engagement of said stop pin with said maximum opening angle defining recess.

13. The light source apparatus according to claim 6, further comprising:

a first planetary gear mechanism including a first internal tooth gear coaxial with said rotation axis of said rotary shutter, a first sun gear coaxial with an axis of said first internal tooth gear, and at least one first planet gear which is simultaneously engaged with said first internal tooth gear and said first sun gear;

a second planetary gear mechanism including a second internal tooth gear identical to said first internal tooth gear and coaxial with said rotation axis of said rotary shutter, a second sun gear identical to said first sun gear and coaxial with an axis of said second internal tooth gear, and at least one second planet gear, identical to said first planet gear, which is simultaneously engaged with said second internal tooth gear and said second sun gear; and a carrier device which is rotatable about an axis coincident with said rotation axis of said rotary shutter, wherein said carrier device holds said first and second planet gears in a same phase position with respect to said first and second internal tooth gears, and supports said first and second planet gears to allow said first and second planet gears to rotate relative to each other, wherein one of said first sun gear and said first internal tooth gear of said first planetary gear mechanism is non-rotatably fixed, and the other of said first sun gear and said first internal tooth gear is rotated together with one of said aperture controlling rotary plates by a motor, and one of said second sun gear and said second internal tooth gear of said second planetary gear mechanism is driven together with the other of said aperture controlling rotary plates by a phase difference motor.

14. The light source apparatus according to claim 13, wherein said first internal tooth gear is fixed so as not to rotate;

wherein said motor drives said first sun gear and said one of said aperture controlling rotary plates; and wherein said phase difference motor drives said second internal tooth gear.

15. The light source apparatus according to claim 14, wherein said second internal tooth gear is rotatably supported by a gear bearing.

16. The light source apparatus according to claim 6, further comprising:

a first planetary gear mechanism including a first internal tooth gear coaxial with said rotation axis of said rotary shutter, a first sun gear coaxial with an axis of said first internal tooth gear, and at least one first planet gear which is simultaneously engaged with said first internal tooth gear and said first sun gear;

a second planetary gear mechanism including a second internal tooth gear identical to said first internal tooth gear and coaxial with said rotation axis of said rotary shutter, a second sun gear identical to said first sun gear and coaxial with an axis of said second internal tooth gear, and at least one second planet gear, identical to said first planet gear, which is simultaneously engaged with said second internal tooth gear and said second sun gear; and a carrier device which is rotatable about an axis coincident with said rotation axis of said rotary shutter, wherein said carrier device holds said first and second planet gears in a same phase position with respect to said first and second internal tooth gears, and supports said first and second planet gears to allow said first and second planet gears to rotate relative to each other, wherein said second internal tooth gear is fixed so as not to rotate, wherein said second sun gear and one of said aperture controlling rotary plates are rotated together, wherein said first sun gear and the other of said aperture controlling rotary plates are driven by a motor, and wherein the first internal tooth gear is driven by a phase difference motor.

17. The light source apparatus according to claim 16, wherein said first internal tooth gear is rotatably supported by a gear bearing.

18. The light source apparatus according to claim 16, wherein the first sun gear is fixed so as not to rotate, wherein said first internal tooth gear is secured to said one of said aperture controlling rotary plates and is driven by said motor, wherein said second internal tooth gear is secured to the other of said aperture controlling rotary plates, and wherein the second sun gear is driven by said phase difference motor.

19. The light source apparatus according to claim 18, wherein one of said first and second internal tooth gears is rotatably supported by a gear bearing.

* * * * *